(12) United States Patent
Mochizuki et al.

(10) Patent No.: US 9,503,937 B2
(45) Date of Patent: Nov. 22, 2016

(54) MOBILE COMMUNICATION SYSTEM, BASE STATION, HIGHER-ORDER APPARATUS, GATEWAY APPARATUS, COMMUNICATION METHOD, AND PROGRAM

(71) Applicant: NEC Corporation, Tokyo (JP)

(72) Inventors: Koichi Mochizuki, Tokyo (JP); Yoshio Ueda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/695,877

(22) Filed: Apr. 24, 2015

(65) Prior Publication Data

US 2015/0230139 A1 Aug. 13, 2015

Related U.S. Application Data

(63) Continuation of application No. 13/389,396, filed as application No. PCT/JP2010/059330 on Jun. 2, 2010, now Pat. No. 9,020,508.

(30) Foreign Application Priority Data

Aug. 12, 2009 (JP) ................. 2009-187320

(51) Int. Cl.
*H04W 36/00* (2009.01)
*H04W 36/38* (2009.01)
(Continued)

(52) U.S. Cl.
CPC ..... *H04W 36/0022* (2013.01); *H04W 36/0055* (2013.01); *H04W 36/38* (2013.01); *H04W 84/045* (2013.01); *H04W 88/08* (2013.01); *H04W 88/16* (2013.01)

(58) Field of Classification Search
CPC ........... H04W 36/0055; H04W 36/08; H04W 84/045; H04W 8/02; H04W 8/26; H04W 28/06; H04W 36/10; H04W 36/14; H04W 48/18; H04W 88/181; H04W 92/12
See application file for complete search history.

(56) References Cited

U.S. PATENT DOCUMENTS 7,580,388 B2 8/2009 Kim
7,660,281 B2 2/2010 Kim
(Continued)

FOREIGN PATENT DOCUMENTS

CN 101438608 A 5/2009
JP 2002-064849 A 2/2002
(Continued)

OTHER PUBLICATIONS

Notice of Allowance dated Oct. 23, 2014 in U.S. Appl. No. 13/816,703.
(Continued)

*Primary Examiner* — Matthew Sams
(74) *Attorney, Agent, or Firm* — Sughrue Mion, PLLC

(57) ABSTRACT

A mobile communication system includes a first Home Node B (HNB); a second HNB; and a HNB gateway (HNB-GW) that is connected to a core network, wherein the first HNB is configured to communicate with a user equipment (UE) before a relocation of intra HNB-GW in which the UE is relocated from the first HNB to the second HNB, wherein the second HNB is configured to communicate with a user equipment (UE) after the relocation and send Iu-UP Initialization comprising an RFCI information to the HNB-GW during the relocation, and wherein the HNB-GW is configured to receive the Iu-UP Initialization.

10 Claims, 20 Drawing Sheets

(51) Int. Cl.
*H04W 84/04* (2009.01)
*H04W 88/08* (2009.01)
*H04W 88/16* (2009.01)

(56) References Cited

U.S. PATENT DOCUMENTS

| | | | |
|---|---|---|---|
| 7,715,344 B2 | 5/2010 | Kim | |
| 8,041,335 B2* | 10/2011 | Khetawat et al. | 455/404.2 |
| 8,077,731 B2 | 12/2011 | Foskett et al. | |
| 8,331,384 B2* | 12/2012 | Ghai | H04L 63/0272 370/328 |
| 9,178,724 B2* | 11/2015 | Hosobe | H04L 12/66 |
| 2002/0072364 A1 | 6/2002 | Tamura | |
| 2002/0077065 A1 | 6/2002 | Tamura et al. | |
| 2003/0032440 A1 | 2/2003 | Sato et al. | |
| 2006/0007861 A1* | 1/2006 | Kurzmann et al. | 370/235 |
| 2006/0067221 A1* | 3/2006 | Lee | H04L 1/1883 370/231 |
| 2007/0123196 A1* | 5/2007 | Tamura | 455/403 |
| 2007/0123197 A1 | 5/2007 | Tamura | |
| 2007/0127357 A1 | 6/2007 | Tamura | |
| 2007/0140293 A1* | 6/2007 | Agarwal et al. | 370/466 |
| 2009/0239538 A1 | 9/2009 | Motegi et al. | |
| 2010/0040023 A1 | 2/2010 | Gallagher et al. | |
| 2010/0041403 A1 | 2/2010 | Khetawat et al. | |
| 2010/0041405 A1* | 2/2010 | Gallagher et al. | 455/436 |
| 2010/0062774 A1 | 3/2010 | Motegi et al. | |
| 2012/0002637 A1* | 1/2012 | Adjakple et al. | 370/331 |
| 2012/0202499 A1* | 8/2012 | Mochizuki et al. | 455/436 |
| 2012/0245928 A1* | 9/2012 | Hosobe | H04L 12/66 704/205 |

FOREIGN PATENT DOCUMENTS

| | | |
|---|---|---|
| JP | 2002-185554 A | 6/2002 |
| JP | 2002-185555 A | 6/2002 |
| KR | 10-2007-0017194 B1 | 2/2007 |
| RU | 2 310 277 C2 | 11/2007 |
| RU | 2006 124 546 A | 1/2008 |
| WO | WO 01/82640 A1 | 11/2001 |
| WO | WO 03/103313 A1 | 12/2003 |
| WO | WO 2008/114625 A1 | 9/2008 |
| WO | WO 2010/019970 A1 | 2/2010 |

OTHER PUBLICATIONS

Korean Office Action dated May 28, 2013, with partial English translation.
Australian Office Action dated Oct. 27, 2014.
International Search Report in PCT/JP2010/059330 dated Jul. 13, 2010 (English Translation Thereof).
3GPP TS 23.153 V8.3.0 (Mar. 2009), Technical Specification, 3$^{rd}$ Generation Partnership Project; Technical Specification Group Core Network and Terminals; Out of band transcoder control; Stage 2; (Release 8).
3GPP TS 25.415 V8.0.0 (Dec. 2008), Technical Specification, 3$^{rd}$ Generation Partnership Project; Technical Specification Group Radio Access Network; UTRAN Iu interface user plane protocols; (Release 8).
3GPP TS 25.413 V8.3.0 (Jun. 2009), Technical Specification, 3$^{rd}$ Generation Partnership Project; Technical Specification Group Radio Access Network; UTRAN Iu interface Radio Access Network Application Part (RANAP) signaling; (Release 8).
3GPP TS 25.467 V8.2.0 (Jun. 2009), Technical Specification, 3$^{rd}$ Generation Partnership Project; Technical Specification Group Radio Access Network; UTRAN architecture for 3G Home Node B (HNB); Stage 2; (Release 8).
3GPP TS 25.468 V8.1.0 (Mar. 2009), Technical Specification, 3$^{rd}$ Generation Partnership Project; Technical Specification Group Radio Access Network; UTRAN Iuh interface RANAP user adaption (RUA) signaling; (Release 8).
3GPP TS 25.469 V8.3.0 (Jun. 2009), Technical Specification, 3$^{rd}$ Generation Partnership Project; Technical Specification Group Radio Access Network; UTRAN Iu interface Home Node B Application Part (HNBAP) signaling; (Release 8).
U.S. Appl. No. 61/089,886, filed Aug. 15, 2008, all pages.
U.S. Appl. No. 61/159,800, filed Mar. 12, 2009, all pages.
Chinese Office Action dated Feb. 8, 2014, with English translation.
Japanese Office Action dated Apr. 8, 2014, with English translation.
"HNB to HNB Relocation: possible solutions", 3GPP TSG RAN WG3 Meeting #63 bis Seoul, Korea, Mar. 23-261, 2009, R3-090933.
Kineto Wireless inc.; GW Terminated HO Signaling. R3-091179. 3GPP, May 8, 2009 3GPP TSG-RAN WG3 Meeting #64 San Francisco, USA May 4-8, 2009.
Russian Official Decision on Grant dated Nov. 28, 2013, with English translation.
Russian Office Action dated Jun. 18, 2013, with English translation.
Japanese Office Action dated Sep. 1, 2015.
NEC "Iu UP Handling During Intra HNB-GW Mobility", R3-091969. 3GPP TSG-RAN WG3 Meeting#65 Shenzhen, P.R. China, Aug. 24-28, 2009.
Siemens "Through Connection and Iu User Plane Initialization During TrFO Establishment", Tdoc N4-000476. 3GPP TrFO/TFO Workshop #2, Helsinki, Finland, Jul. 16, 2000.

* cited by examiner

9.1.9 RELOCATION REQUIRED (3GPP TS 25.413)

| IE/Group Name | Presence | Range | IE type and reference | Semantics description | Criticality | Assigned Criticality |
|---|---|---|---|---|---|---|
| ... | ... | ... | | | ... | ... |
| RFCI-length of subflow mapping | O | 1 to <Max no ofRFCIs> | | | | |
| >RFCI | M | | | | | |
| >RFCI Subflow | M | 1 to <maxRAB-Subflows> | | | | |
| >>Length of subflow | M | | BIT STRING (0...65535) | | | |

9.1.10 RELOCATION REQUEST (3GPP TS 25.413)

| IE/Group Name | Presence | Range | IE type and reference | Semantics description | Criticality | Assigned Criticality |
|---|---|---|---|---|---|---|
| ... | ... | | ... | ... | ... | ... |
| RFCI-length of subflow mapping | O | 1 to <Max no ofRFCIs> | | | | |
| >RFCI | M | | | | | |
| >RFCI Subflow | M | 1 to <maxRAB-Subflows> | | | | |
| >>Length of subflow | M | | BIT STRING (0...65535 ) | | | |

Fig. 11

9.1.4 Direct Transfer (3GPP TS 25.468)

| IE/Group Name | Presence | Range | IE type and reference | Semantics description | Criticality | Assigned Criticality |
|---|---|---|---|---|---|---|
| ... | ... | ... | ... | ... | ... | ... |
| RFCI-length of subflow mapping | O | 1 to <Max no ofRFCIs> | | | | |
| >RFCI | M | | | | | |
| >RFCI Subflow | M | 1 to <maxRAB-Subflows> | | | | |
| >>Length of subflow | M | | BIT STRING (0...65535) | | | |

MOBILE COMMUNICATION SYSTEM, BASE STATION, HIGHER-ORDER APPARATUS, GATEWAY APPARATUS, COMMUNICATION METHOD, AND PROGRAM

CROSS-REFERENCE TO RELATED APPLICATIONS

The present application is a Continuation application of U.S. patent application Ser. No. 13/389,396, filed on Feb. 7, 2012, which is based on International Patent Application PCT/JP2010/059330 and which claims priority from Japanese Patent Application No. 2009-187320 filed on Aug. 12, 2009, the entire contents of which are hereby incorporated by reference.

TECHNICAL FIELD

The present invention relates to a mobile communication system, a base station, a higher-order apparatus, a gateway apparatus, a communication method, and a program.

BACKGROUND ART

A mobile communication system that is made up from a Node-B (base station), an RNC (Radio Network Controller), and a CN (Core Network) is representative of an existing 3GPP ($3^{rd}$ Generation Partnership Project) mobile communication system.

AMR (Adaptive Multi-Rate) can be offered as the voice data encoding method in a mobile communication system of this configuration. AMR is a method in which the rate of voice data is altered dynamically according to line conditions.

In a mobile communication system that employs AMR, a transcoder is established in the CN in order to make the rates of encoding and decoding of voice data identical, and transcoding is carried out by the transcoder as necessary.

Data frames of voice data that are encoded by AMR are made up from a plurality of subframes having different data sizes. The combination of this plurality of subframes differs according to the rate of the voice data, and an RFCI (RAB sub-Flow Combination Indicator) value is prescribed as an identifier for each of these combinations. In other words, an RFCI value is defined for each rate of voice data.

In a mobile communication system that employs AMR, RFCI information is set as control information in voice encoding in each Node-B. RFCI information includes information that identifies for each RFCI value the structure of the data frame that is indicated by that RFCI value, and more specifically, information relating to the number of subflows that make up that data frame and the data size for each sub-flow. In addition to AMR, RFCI information is also used in Wide-Band AMR (wide-band voice codec) and CS streaming services (such as Fax or modem communication).

When transmitting voice data that have been encoded at a particular rate, a Node-B transmits voice data to which the RFCI value that corresponds to this rate is appended to another Node-B, and upon receiving voice data from another Node-B, decodes this voice data at the rate that corresponds to the RFCI value that is appended to the voice data.

When UE (User Equipment: a terminal) carries out voice communication by way of two Node-Bs, if the RFCI information between the two Node-Bs matches, each RFCI value in these two items of RFCI information indicates a data frame of the same structure. As a result, encoding/decoding of voice data can be carried out between the two Node-Bs at the same rate without passing by way of a transcoder in the CN. A mode of carrying out voice communication without passing by way of a transcoder in this way is referred to as "Transcoder-Free Operation (TrFO)." This mode is prescribed in 3GPP TS23.153 (Non-Patent Document 1).

If, on the other hand, the RFCI information between the two Node-Bs does not match, data frames of different structure may be indicated in these two items of RFCI information even though the RFCI values are the same. In such cases, encoding/decoding of voice data cannot be carried out at the same rate between the two Node-Bs unless carried out by way of a transcoder, whereby voice communication cannot be carried out while maintaining transcoder-free operation (TrFO).

Accordingly, RFCI information between two Node-Bs is preferably caused to match in order to implement voice communication while maintaining transcoder-free operation (TrFO).

However, movement of UE occurs frequently in a mobile communication system, whereby RFCI information of the movement-origin Node-B to which the UE is connected before movement is believed to often fail to match the RFCI information of the movement-destination Node-B to which the UE is connected after movement.

3GPP TS25.415 (Non-Patent Document 2) prescribes the handover of RFCI information by means of a Iu-UP Initialization message that is prescribed in Iu-UP (Iu interface user plane) protocol by way of CN between the RNC in the event of SRNS (Serving Radio Network Subsystem) relocation in which the RNC to which the movement-origin Node-B of a UE is connected differs from the RNC to which the movement-destination Node-B is connected.

LITERATURE OF THE PRIOR ART

Non-Patent Documents

Non-Patent Document 1: 3GPP TS 23.153
Non-Patent Document 2: 3GPP TS 25.415
Non-Patent Document 3: 3GPP TS 25.413
Non-Patent Document 4: 3GPP TS 25.467
Non-Patent Document 5: 3GPP TS 25.468
Non-Patent Document 6: 3GPP TS 25.469

SUMMARY OF THE INVENTION

Problem to be Solved by the Invention

However, mobile communication systems are currently being investigated in 3GPP that are made up from compact base stations for residences and small businesses referred to as HNB (Home Node-B: compact base station), HNB GW (Home Node-Gateway), and a CN. The configuration of such a mobile communication system is next described in detail using FIG. 1.

Referring to FIG. 1, this mobile communication system includes: UE 1, HNB-S 2, HNB-T 3, HNB-GW 4, CN 6 that includes CN node 5, HNB-GW 7, and HNB-X 8.

UE 1 is a $3^{rd}$ Generation mobile portable telephone (terminal).

HNB-S 2 and HNB-T 3, and HNB-X 8 are small base stations for residences or small offices.

HNB-S 2 is the movement-origin HNB to which UE 1 is connected before movement.

HNB-T 3 is the movement-destination HNB to which UE 1 is connected after movement.

HNB-X 8 is an HNB that has under its control the UE (not shown) that is the communication partner of UE 1.

HNB-GW 4 is a gateway apparatus that connects HNB-S 2 and HNB-T 3 to CN 6, and HNB-GW 7 is the gateway apparatus that connects HNB-X 8 to CN 6.

CN 6 is a 3$^{rd}$ Generation mobile switched network.

CN node 5 is a core network apparatus such as an HMS (Home NodeB Management System) or MSC (Mobile Switching Center) that is provided in CN 6.

UE 1 moves from HNB-S 2 to HNB-T 3 that is subordinate to the same HNB-GW 4. This type of movement is referred to as "intra-HNB-GW relocation."

Before movement, UE 1 carries out voice communication with UE that is subordinate to HNB-X 8 by way of HNB-S 2, HNB-GW 4, CN 6, HNB-GW 7, and HNB-X 8.

After movement, UE 1 carries out speech communication with UE that is subordinate to HNB-X 8 by way of HNB-T 3, HNB-GW 4, CN 6, HNB-GW 7, and HNB-X 8.

In FIG. 1, the opposite system of the communication partner of UE 1 is a 3GPP radio communication system made up of HNB-X 8/HNB-GW 7/CN 6, but this system may also be an existing 3GPP radio communication system that is made up of Node-B/RNC/CN.

It is here assumed that HNB is installed by an individual party and not a portable telephone business. As a result, although subordinate to the same HNB-GW 4, HNB-S 2 and HNB-T 3 are assumed to have different vendors.

As a result, it is easily conceivable that RFCI information between HNB-S 2 and HNB-T 3 do not match at the time of the occurrence of an intra-HNB-GW relocation between HNB-S 2 and HNB-T 3 by UE 1.

If the RFCI information does not match, the problem arises that voice communication cannot be carried out while maintaining transcoder-free operation (TrFO).

In 3GPP, discussion is ongoing regarding standardization of the method of intra-HNB-GW relocation between HNB even in a mobile communication system made up of HNB/HNB-GW/CN, but as yet no method of solution has been proposed for a case in which RFCI information between HNBs does not match.

It is therefore an object of the present invention to provide a mobile communication system, a base station, a higher-order apparatus, a gateway apparatus, a communication method, and a program that enable voice communication while maintaining transcoder-free operation (TrFO) even in the event of intra-HNB-GW relocation between HNBs and thus solve the above-described problems.

Means for Solving the Problem

The first mobile communication system of the present invention is a mobile communication system that includes a terminal, a movement-origin base station to which the terminal is connected before movement, a movement-destination base station to which the terminal is connected after movement, and a higher-order apparatus that has the movement-origin base station and the movement-destination base station under its control; wherein:

control information in voice encoding in the movement-origin base station and the movement-destination base station is set in advance;

the movement-origin base station includes the control information of its own station in a first message and transmits the first message to the higher-order apparatus; and the higher-order apparatus includes the control information of the movement-origin base station in a second message and transmits the second message to the movement-destination base station.

The second mobile communication system of the present invention is a mobile communication system that includes a terminal, a movement-origin base station to which the terminal is connected before movement, a movement-destination base station to which the terminal is connected after movement, and a gateway apparatus that connects the movement-origin base station and the movement-destination base station to a core network; wherein:

as control information in voice encoding in the movement-origin base station and the movement-destination base station, control information is set in advance for each identifier, this control information identifying the structure of a data frame, which is indicated by the identifier, of voice data that have been voice-encoded;

the movement-origin base station includes the control information of its own station in a first message and transmits the first message to the gateway apparatus;

the movement-destination base station includes the control information of its own station in a second message and transmits the second message to the gateway apparatus; and the gateway apparatus: stores the control information of the movement-origin base station that is contained in the first message and the control information of the movement-destination base station that is contained in the second message; when the control information of the movement-origin base station and the control information of movement-destination base station do not match, upon subsequent reception of voice data from the movement-destination base station, converts the identifiers that are appended to the voice data to identifiers that indicate data frames that have the same construction in the control information of the movement-origin base station; and transmits voice data to which the converted identifiers have been appended to the core network.

The first base station of the present invention is a base station of a movement origin to which a terminal is connected before movement and includes:

a control unit in which control information in voice encoding is set in advance and that includes the control information of its own station in a message; and a transceiver unit that transmits the message to a higher-order apparatus.

The second base station of the present invention is movement-destination base station to which a terminal is connected after movement and includes:

a control unit to which control information in voice encoding is set in advance; and a transceiver unit that receives a first message that contains the control information of a movement-origin base station to which the terminal is connected before movement.

The higher-order apparatus of the present invention is a higher-order apparatus that has under its control a movement-origin base station to which a terminal is connected before movement and a movement-destination base station to which the terminal is connected after movement, the higher-order apparatus further including:

where control information in voice encoding is set in advance in the movement-origin base station and the movement-destination base station, a transceiver unit that receives a first message that contains the control information of the movement-origin base station from the movement-origin base station; and a control unit that includes the control information of the movement-origin base station in a second message, wherein the transceiver unit transmits the second message to the movement-destination base station.

The gateway apparatus of the present invention is a gateway apparatus that connects a movement-origin base station to which a terminal is connected before movement and a movement-destination base station to which the terminal is connected after movement to a core network; wherein:

as control information in voice encoding in the movement-origin base station and the movement-destination base station, control information is set in advance for each identifier, this control information identifying the structure of a data frame, which is indicated by the identifier, of voice data that have been encoded;

the gateway apparatus further including:

a transceiver unit that both receives from the movement-origin base station a first message that contains the control information of the movement-origin base station and receives from the movement-destination base station a second message that contains the control information of the movement-destination base station;

a memory unit that stores the control information of the movement-origin base station that is contained in the first message and the control information of the movement-destination base station that is contained in the second message;

a control unit that, when the control information of the movement-origin base station and the control information of the movement-destination base station do not match, upon subsequent reception of voice data from the movement-destination base station, converts the identifiers that are appended to the voice data to identifiers that indicate data frames that have the same structure in the control information of the movement-origin base station; and a second transceiver unit that transmits voice data to which the converted identifiers have been appended to the core network.

The first communication method of the present invention is a communication method realized by a mobile communication system that includes a terminal, a movement-origin base station to which the terminal is connected before movement, a movement-destination base station to which the terminal is connected after movement, and a higher-order apparatus that has under its control the movement-origin base station and the movement-destination base station; the communication method including steps of: the movement-origin base station including control information in voice encoding of its own station in a first message and transmitting the first message to the higher-order apparatus; and the higher-order apparatus including the control information of the movement-origin base station in a second message and transmitting the second message to the movement-destination base station.

The second communication method of the present invention is a communication method realized by a mobile communication system that includes a terminal, a movement-origin base station to which the terminal is connected before movement, a movement-destination base station to which the terminal is connected after movement, and a gateway apparatus that connects the movement-origin base station and the movement-destination base station to a core network; the communication method including steps of:

the movement-origin base station: including in a first message control, as control information in voice encoding in its own station, control information for each identifier, this control information identifying the structure of a data frame, which is indicated by the identifier, of voice data that have undergone voice encoding, and transmitting the first message to the gateway apparatus;

the movement-destination base station including the control information of its own station in a second message and transmitting the second message to the gateway apparatus; the gateway apparatus storing the control information of the movement-origin base station that is contained in the first message and the control information of the movement-destination base station that is contained in the second message;

when the control information of the movement-origin base station and the control information of the movement-destination base station do not match, the gateway apparatus subsequently, upon receiving voice data from the movement-destination base station, converting the identifiers that are appended to the voice data to identifiers that indicate data frames that have the same construction in the control information of the movement-origin base station; and the gateway apparatus transmitting to the core network voice data to which the converted identifiers have been appended.

The third communication method of the present invention is a communication method realized by a movement-origin base station to which a terminal is connected before movement and includes steps of including control information in voice encoding in its own station in a message, and transmitting the message to a higher-order apparatus.

The fourth communication method of the present invention is a communication method realized by a movement-destination base station to which a terminal is connected after movement and includes a step of receiving from a higher-order apparatus a first message that contains control information in voice encoding of a movement-origin base station to which the terminal was connected before movement.

The fifth communication method of the present invention is a communication method realized by a higher-order apparatus that has under its control a movement-origin base station to which a terminal is connected before movement and a movement-destination base station to which the terminal is connected after movement and includes steps of:

receiving from the movement-origin base station a first message that contains control information in the voice encoding of the movement-origin base station;

including the control information of the movement-origin base station in a second message; and transmitting the second message to the movement-destination base station.

The sixth communication method of the present invention is a communication method realized by a gateway apparatus that connects a movement-origin base station, to which a terminal is connected before movement and a movement-destination base station to which the terminal is connected after movement, to a core network; the communication method including steps of:

both: receiving from the movement-origin base station a first message that contains, as control information in voice encoding of the movement-origin base station, control information for each identifier that identifies the construction of a data frame, which is indicated by the identifier, of voice data that have undergone voice encoding, and receiving from the movement-destination base station a second message that includes the control information of the movement-destination base station;

storing the control information of the movement-origin base station that is contained in the first message and the control information of the movement-destination base station that is contained in the second message;

when the control information of the movement-origin base station and the control information of the movement-destination base station do not match, upon subsequently receiving voice data from the movement-destination base station, converting the identifiers that are appended to the voice data to identifiers that indicate data frames that have the same construction in the control information of the movement-origin base station; and transmitting to the core network voice data to which the converted identifiers have been appended.

The first program of the present invention causes a movement-origin base station to which a terminal is connected before movement to execute procedures of:

including control information in the voice encoding of its own station in a message; and transmitting the message to a higher-order apparatus.

The second program of the present invention causes a movement-destination base station to which a terminal is connected after movement to execute a procedure of:

receiving from a higher-order apparatus a first message that includes control information in voice encoding of a movement-origin base station to which the terminal was connected before movement.

The third program of the present invention causes a higher-order apparatus that has under its control a movement-origin base station to which a terminal is connected before movement and a movement-destination base station to which the terminal is connected after movement to execute procedures of:

receiving from the movement-origin base station a first message that contains control information in voice encoding of the movement-origin base station;

including in a second message the control information of the movement-origin base station; and transmitting the second message to the movement-destination base station.

The fourth program of the present invention causes a gateway apparatus that connects a movement-origin base station, to which a terminal is connected before movement and a movement-destination base station to which the terminal is connected after movement, to a core network to execute procedures of:

both: receiving from the movement-origin base station a first message that contains, as control information in voice encoding of the movement-origin base station, control information for each identifier that identifies the construction of a data frame, which is indicated by the identifier, of voice data that have undergone voice encoding, and receiving from the movement-destination base station a second message that contains the control information of the movement-destination base station;

storing the control information of the movement-origin base station that is contained in the first message and the control information of the movement-destination base station that is contained in the second message;

when the control information of the movement-origin base station and the control information of the movement-destination base station do not match, upon subsequently receiving voice data from the movement-destination base station, converting identifiers that are appended to the voice data to identifiers that indicate data frames that have the same construction in the control information of the movement-origin base station; and transmitting to the core network voice data to which the converted identifiers have been appended.

Effect of the Invention

According to the first mobile communication system of the present invention, a movement-origin base station transmits control information of its own station to a higher-order apparatus, and the higher-order apparatus transmits the control information of the movement-origin base station to the movement-destination base station.

Accordingly, the movement-destination base station is able to take over the control information from the movement-origin base station and thus carry out voice communication while maintaining transcoder-free operation (TrFO) without change in the event of relocation between a movement-origin base station and a movement-destination base station.

According to the second mobile communication system of the present invention, when the control information of the movement-origin base station and the control information of the movement-destination base station do not match, a gateway apparatus converts the identifiers that are appended to voice data that are subsequently received from the movement-destination base station to identifiers that indicate data frames that have the same construction in the control information of the movement-origin base station.

As a result, at the time of the occurrence of relocation between a movement-origin base station and a movement-destination base station, voice communication can be performed while maintaining transcoder-free operation (TrFO) without alteration even when control information is not handed over between the movement-origin base station and the movement-destination base station.

BRIEF DESCRIPTION OF THE DRAWINGS

FIG. 6 shows a RANAP: Relocation Required message that has been modified by the second exemplary embodiment of the present invention.

FIG. 7 shows a RANAP: Relocation Request message that has been modified by the second exemplary embodiment of the present invention.

FIG. 11 shows a RUA Direct Transfer message that has been modified by the third exemplary embodiment of the present invention.

BEST MODE FOR CARRYING OUT THE INVENTION

Exemplary embodiments of the present invention are next described with reference to the accompanying drawings.

In the exemplary embodiments described hereinbelow, the overall configuration of the mobile communication system is similar to the system shown in FIG. 1.

First Exemplary Embodiment

This exemplary embodiment is characterized by HNB-S 2, HNB-T 3, and a higher-order apparatus (hereinbelow referred to as "higher-order apparatus 9") that is either HNB-GW 4 or CN node 5.

In the present exemplary embodiment, the RFCI information of HNB-S 2 is reported from HNB-S 2 to HNB-T 3 by way of higher-order apparatus 9.

Figure 2:
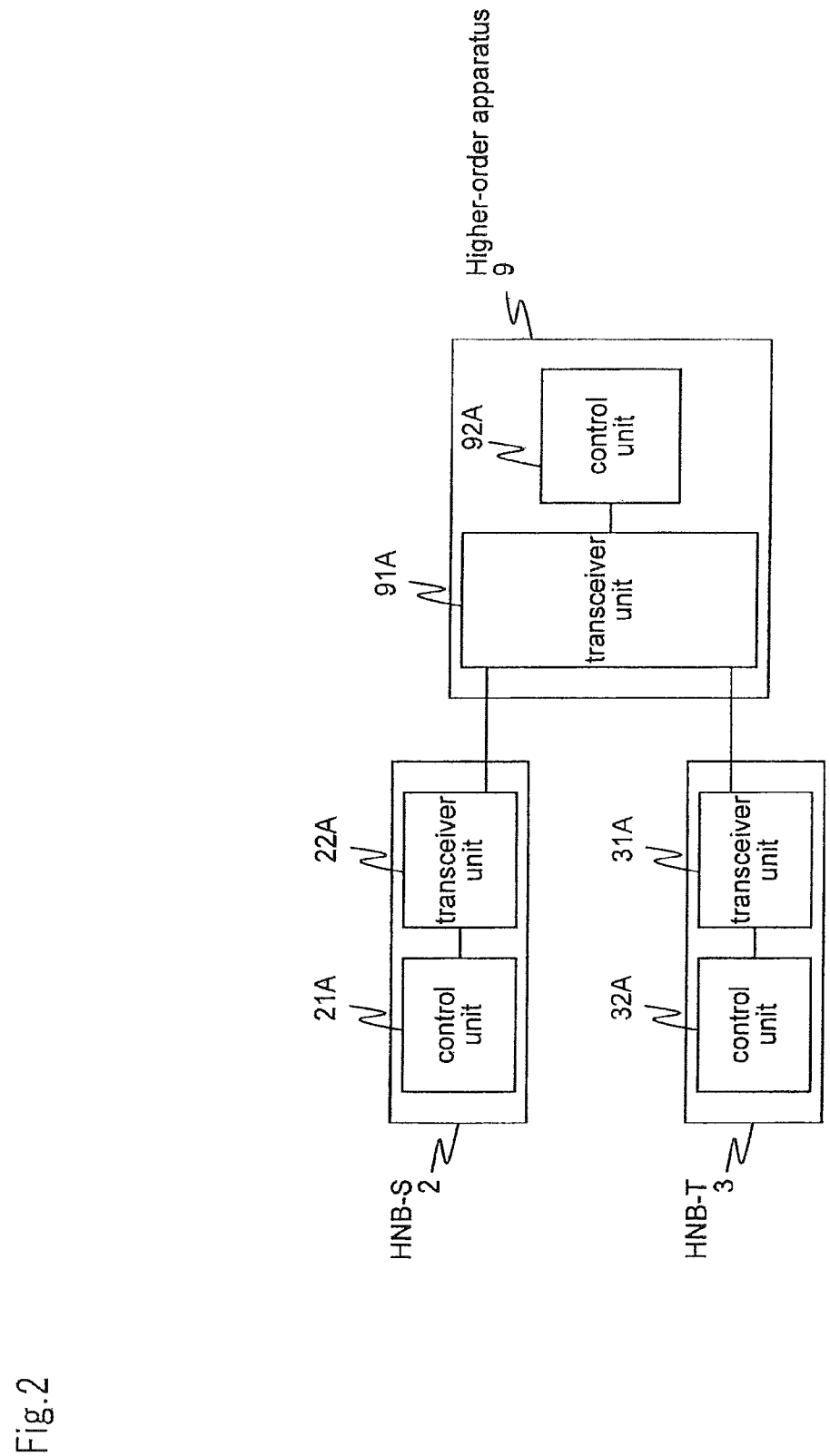
FIG. 2 is a block diagram showing the internal configuration of an HNB and a higher-order apparatus in the mobile communication system of the first exemplary embodiment of the present invention.

Referring to FIG. 2, HNB-S 2 of the present exemplary embodiment includes control unit 21A that includes the RFCI information of HNB-S 2 in a first message and transceiver unit 22A that transmits this first message to higher-order apparatus 9.

Higher-order apparatus 9 of the present exemplary embodiment further includes transceiver unit 91A that receives the first message from HNB-S 2 and control unit 92A that includes the RFCI information contained in the first message in a second message, transceiver unit 91A further transmitting the second message to HNB-T 3.

In addition, HNB-T 3 of the present exemplary embodiment includes transceiver unit 31A that receives the second message from higher-order apparatus 9 and control unit 32A that initializes the RFCI information of HNB-T 3 and sets (resets) it to the RFCI information contained in the second message.

Figure 3:
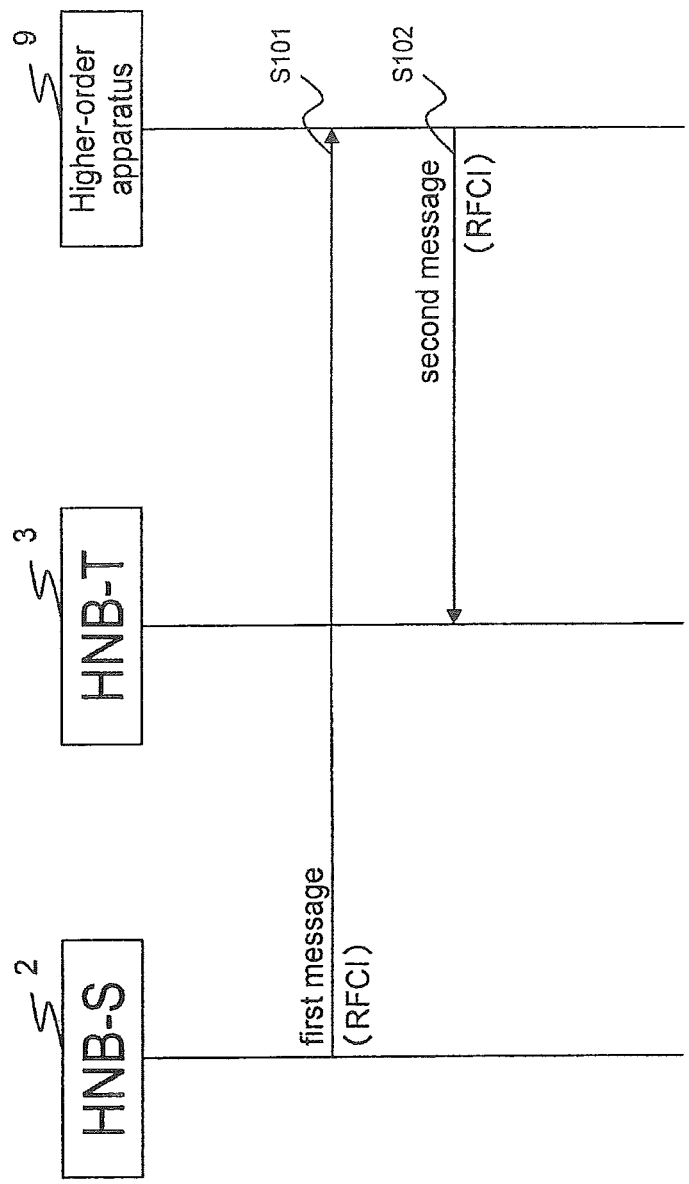
FIG. 3 is a sequence chart for describing the operation of the mobile communication system of the first exemplary embodiment of the present invention.

The operations of the mobile communication system of the present exemplary embodiment are next described in conjunction with the sequence chart shown in FIG. 3.

In Step S101, HNB-S 2 transmits a first message that contains the RFCI information of HNB-S 2 to higher-order apparatus 9.

In Step S102, higher-order apparatus 9 transmits to HNB-T 3 a second message that contains the RFCI information that is contained in the first message that was received from HNB-S 2.

In the present exemplary embodiment as described above, HNB-T 3 is able to take over the RFCI information from HNB-S 2 by way of higher-order apparatus 9, whereby the effect is obtained in which voice communication can be carried on while maintaining transcoder-free operation (TrFO) without alteration even in the event of intra-HNB-GW relocation between HNB-S2 and HNB-T3.

Second Exemplary Embodiment

The present exemplary embodiment is an example that is more specific than the first exemplary embodiment with higher-order apparatus 9 as HNB-GW 4.

In the present exemplary embodiment, the RFCI information of HNB-S 2 is reported from HNB-S 2 to HNB-T 3 by way of HNB-GW 4 by means of an RANAP message.

Figure 4:
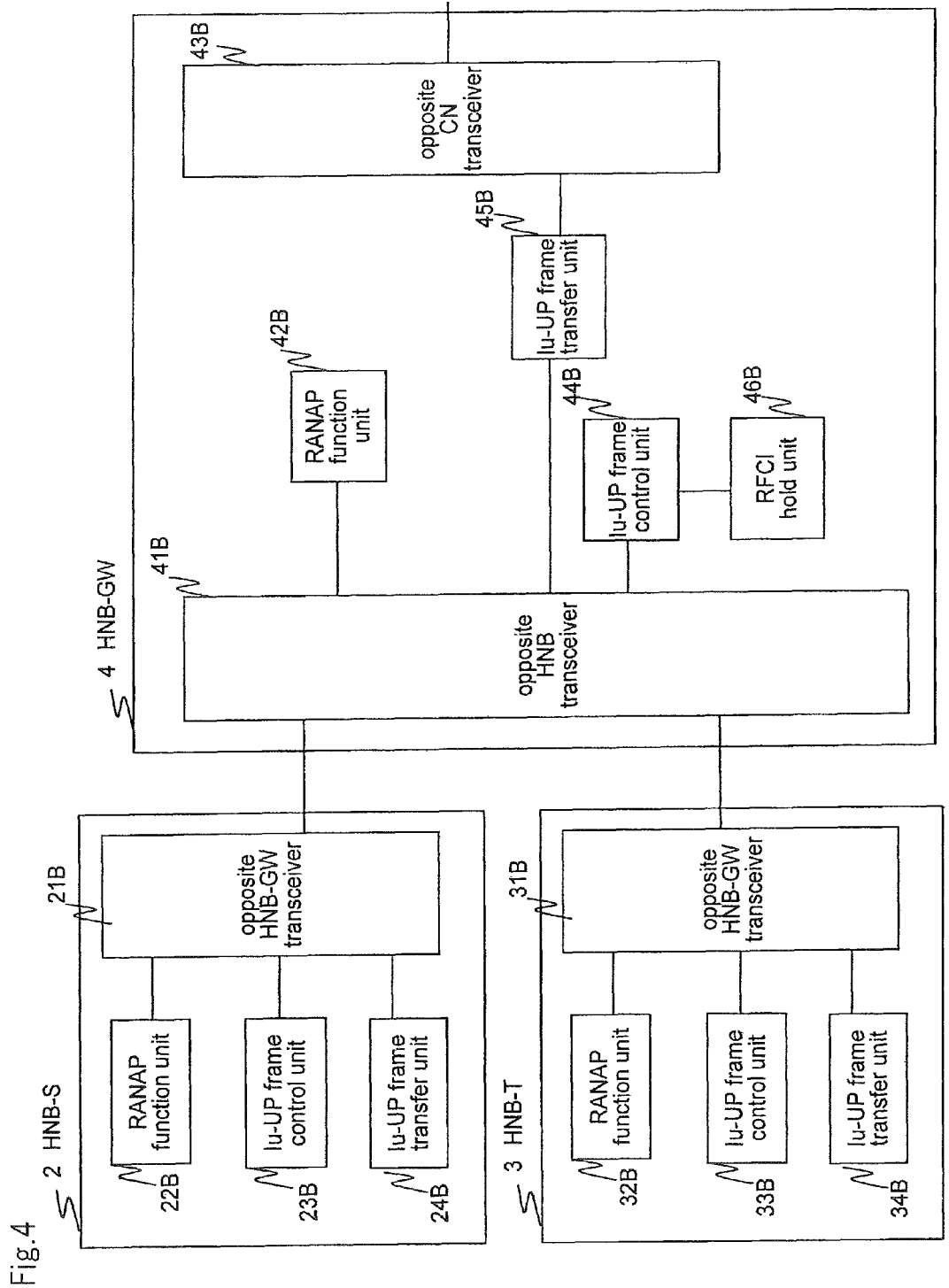
FIG. 4 is a block diagram showing the internal configuration of the HNB and the HNB-GW in the mobile communication system of the second exemplary embodiment of the present invention.

Referring to FIG. 4, HNB-GW 4 of the present exemplary embodiment includes: opposite HNB transceiver 41B, RANAP function unit 42B, opposite CN transceiver 43B, Iu-UP frame control unit 44B, Iu-UP frame transfer unit 45B, and RFCI hold unit 46B. In FIG. 4, opposite HNB transceiver 41B makes up transceiver unit 91A of FIG. 2, and the other function blocks make up control unit 92A of FIG. 2.

HNB-S 2 of the present exemplary embodiment includes: opposite HNB-GW transceiver 21B, RANAP function unit 22B, Iu-UP frame control unit 23B, and Iu-UP frame transfer unit 24B. In FIG. 4, opposite HNB-GW transceiver 21B makes up transceiver unit 22A of FIG. 2, and the other function blocks make up control unit 21A of FIG. 2.

HNB-T 3 of the present exemplary embodiment includes: opposite HNB-GW transceiver 31B, RANAP function unit 32B, Iu-UP frame control unit 33B, and Iu-UP frame transfer unit 34B. In FIG. 4, opposite HNB-GW transceiver 31B makes up transceiver unit 31A of FIG. 2, and the other function blocks make up control unit 32A of FIG. 2.

Opposite HNB transceiver 41B includes an interface for connecting HNB-S 2 and HNB-T 3 and carries out transmission and reception of voice data with HNB-S 2 and HNB-T 3.

RANAP function units 22B, 32B, and 42B realize the RANAP (Radio Access Network Application Part) protocol functions prescribed by 3GPP TS25.413 (Non-Patent Document 3). For example, RANAP function units 22B, 32B, and 42B have a function of generating RANAP messages and a function of terminating RANAP messages.

Opposite CN transceiver 43B has an interface for connecting with CN node 5, and carries out the transmission and reception of voice data with CN node 5.

Iu-UP frame control units 23B, 33B, and 44B realize the Iu-UP protocol functions prescribed by 3GPP TS25.415

(Non-Patent Document 2). For example, Iu-UP frame control units 23B, 33B, and 44B have the function of generating Iu-UP initialization messages (hereinbelow abbreviated as "Iu-UP Init messages") and a function of terminating Iu-UP Init messages. In addition, Iu-UP frame control unit 44B has a function of reporting RFCI information that is contained in Iu-UP Init messages to RFCI hold unit 46B and a function of, in the event of a restart of Iu-UP Initialization, issuing a request for comparison of RFCI information to RFCI hold unit 46B.

Iu-UP frame transfer units 24B, 34B and 45B realize the Iu-UP protocol functions prescribed by 3GPP TS25.415 (Non-Patent Document 2). For example, Iu-UP frame transfer units 24B, 34B, and 45B have the function of transferring Iu-UP frame data.

RFCI hold unit 46B has the function of holding RFCI information that is reported from Iu-UP frame control unit 44B and the function of reporting comparison results based on the request for comparison of RFCI information from Iu-UP frame control unit 44B.

Opposite HNB-GW transceivers 21B and 31B have interfaces for connecting with HNB-GW 4 and carry out transmission and reception of voice data with HNB-GW 4.

Two current 3GPP provisions relating to the present exemplary embodiment are next described.
(1) First Provision 3GPP TS25.415 (Non-Patent Document 2) prescribes that RAB parameters relating to radio access bearers (RAB) between UE and CN be reported by RANAP messages between CN and RNC (HNB-GW). More specifically, the RAB parameters are parameters (such as data transfer rate, block size, error rate) of QoS (Quality of Service) that accord with the type of service.

However, the RAB parameters are closely related to RFCI information that is exchanged by means of Iu-UP Initialization messages, and there is consequently a concern that a mismatching of status will occur when there is modification of only RFCI information unaccompanied by the modification of RAB parameters (RAB Modification) due to the restarting of Iu-UP Initialization.

As a result, in order to prevent the occurrence of this type of procedure, 3GPP TS25.415 (Non-Patent Document 2) prescribes that, except for RAB modification, restarting of Iu-UP Initialization must not be implemented from the same SRNS (First Provision).

Figure 1:
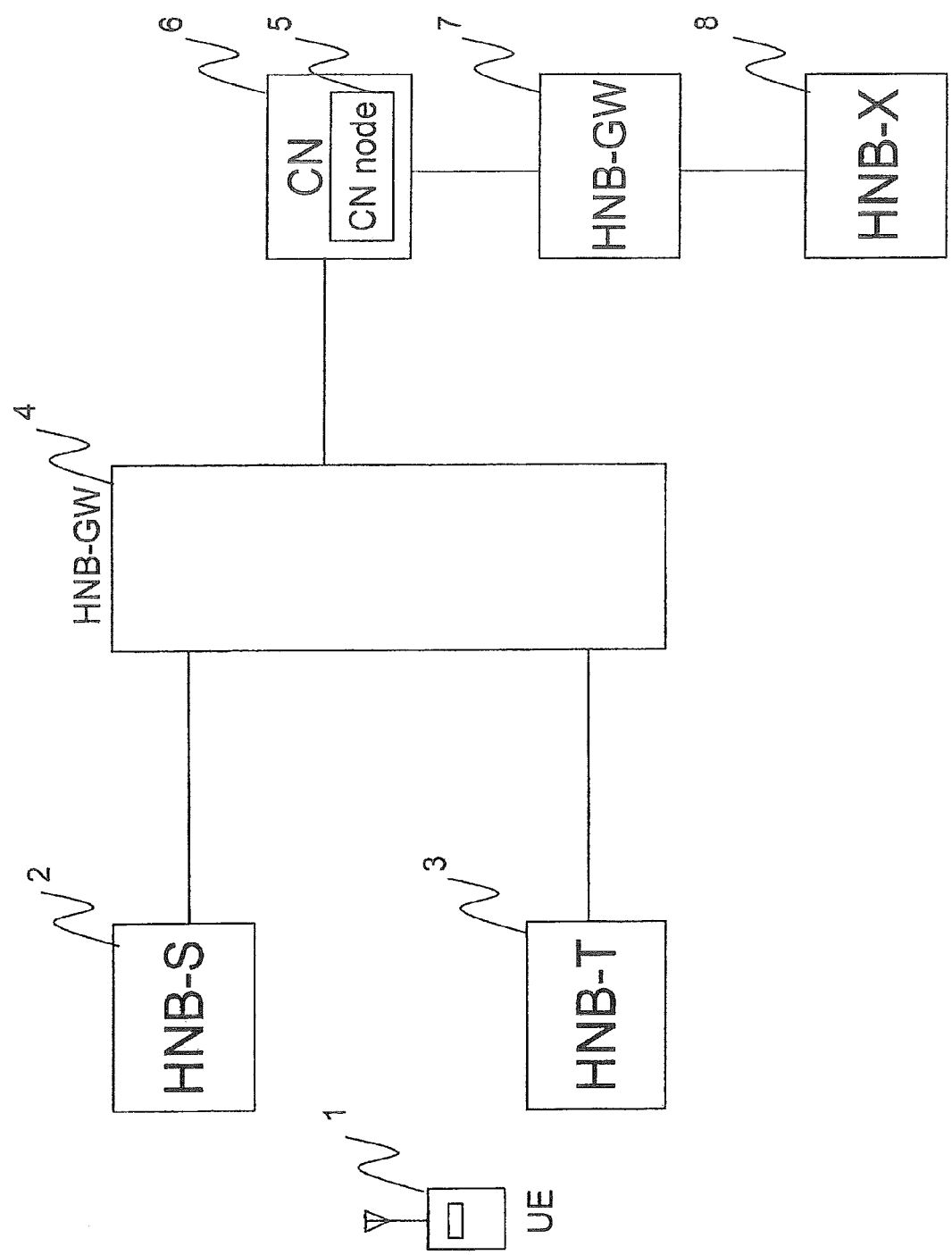
FIG. 1 shows the configuration of a mobile communication system that is made up of HNB/HNB-GW/CN.

If the function of handing over RFCI information by means of an Iu-UP Initialization message in a mobile communication system that is made up of existing Node-B/RNC/CN is applied to a mobile communication system that is made up of an HNB/HNB-GW/CN, Iu-UP Initialization is activated to CN 6 from each of HNB-S 2 and HNB-T 3 in FIG. 1. In this case, however, the reactivation of Iu-UP Initialization is implemented by the same SRNS (HNB-GW 4) as seen from CN 6, and the first provision is therefore violated.
(2) Second Provision The above-described problem of the first provision can conceivably be solved by terminating an Iu-UP Initialization message at an HNB-GW (i.e., by not terminating at a CN).

In 3GPP TS25.467 (Non-Patent Document 4), however, there is concern regarding the increase in signal processing and the increased complexity of processing in HNB-GW when an Iu-UP message is terminated at an HNB-GW, and it is therefore stipulated that messages of Iu-UP protocol not be terminated at an HNB-GW (Second Provision). As a result, when an Iu-UP Initialization message is terminated at an HNB-GW, the second provision is violated.

The present exemplary embodiment enables the performance of voice communication while maintaining transcoder-free operation (TrFO) unchanged in the event of intra-HNB-GW relocation between HNB-S 2 and HNB-T 3 without modifying the above-described first provision and second provision.

Figure 5:
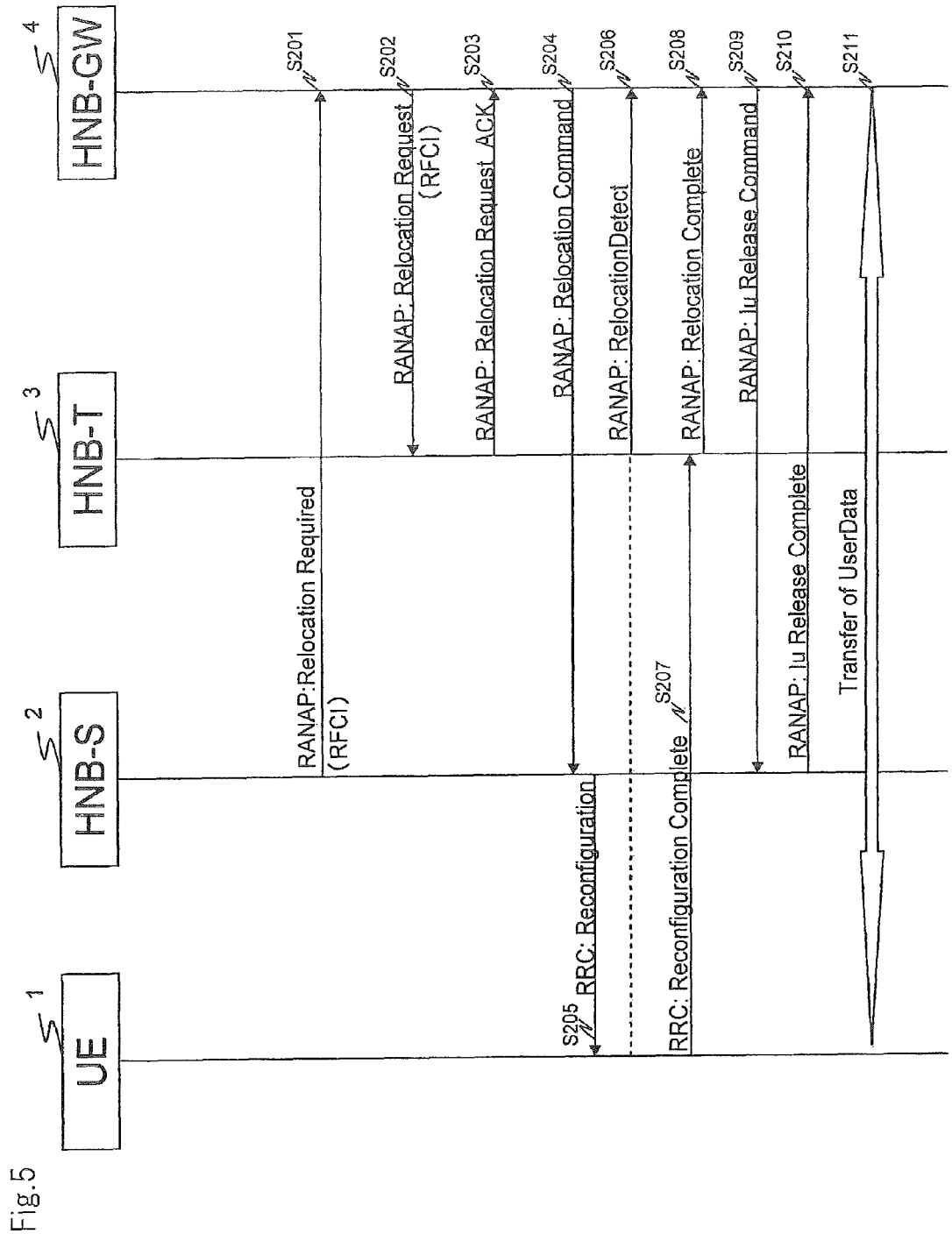
FIG. 5 is a sequence chart for explaining the operation of the mobile communication system of the second exemplary embodiment of the present invention.

The operations of the present exemplary embodiment are next described in conjunction with the sequence chart shown in FIG. 5.

In Step S201, HNB-S 2 first begins a Relocation procedure realized by transmitting to HNB-GW 4 a RANAP: Relocation Required message that request's the movement of UE 1 from HNB-S 2.

In the present exemplary embodiment, RFCI information of an Iu-UP Initialization message is added in a RANAP: Relocation Required message of 9.1.9 of 3GPP TS25.413 (Non-Patent Document 3). FIG. 6 shows a RANAP: Relocation Required message that has been modified by the present exemplary embodiment. FIG. 6 shows only the points that have been modified. In the RANAP: Relocation Required message of the present exemplary embodiment, "RFCI" that is the RFCI value, the "RCFI subflow" that is the number of subflows that make up the data frames shown by this RFCI value, and the "Length of Subflow" that is the data size for each subflow are added as RFCI information.

HNB-GW 4 terminates the RANAP: Relocation Required message at RANAP function unit 42B and obtains the RFCI information.

In Step S202, HNB-GW 4 further requests the securing of the resources of HNB-T 3 by transmitting to HNB-T 3 a RANAP: Relocation Request message requesting the movement of UE 1 to HNB-T 3.

In the present exemplary embodiment, when RFCI information is contained in the RANAP: Relocation Required message in Step S201, RANAP function unit 42B obtains the RFCI information and includes this RFCI information in a RANAP: Relocation Request message.

In other words, in the present exemplary embodiment, RFCI information is added to a RANAP: Relocation Request message of 9.1.10 of 3GPP T525.413 (Non-Patent Document 3). FIG. 7 shows the RANAP: Relocation Request message that has been modified by the present exemplary embodiment. FIG. 7 shows only those points that have been modified. As with the RANAP: Relocation Required message of FIG. 6, "RFCI" that is the RFCI value, "RFCI Subflow" that is the number of subflows that make up the data frames that are indicated by the RFCI value, and the "Length of Subflow" that is the data size of each subflow are added as RFCI information to the RANAP: Relocation Request message of the present exemplary embodiment HNB-T 3 terminates the RANAP: Relocation Request message at RANAP function unit 32B. If RFCI information is contained in this RANAP: Relocation Request message, HNB-T 3 initializes the RFCI information of HNB-T 3 and resets it to the RFCI information contained in the RANAP: Relocation Request message.

In this way, upon subsequently receiving uplink voice data from UE 1 and downlink voice data from CN 6, HNB-T 3 is able to correctly recognize not only the structure of data frames of the voice data but also the rate by means of the RFCI values appended to these voice data.

Figure 8:
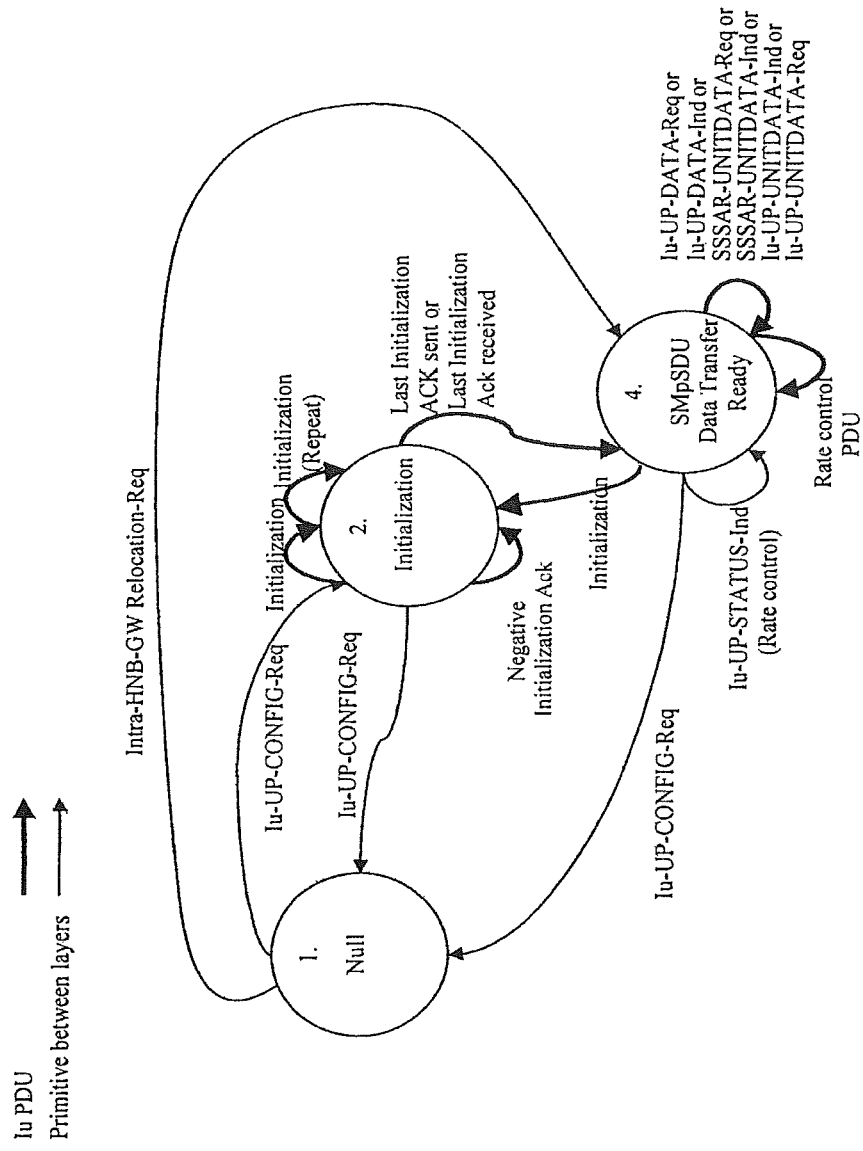
FIG. 8 is a state transition chart of Iu-UP Protocol that has been modified by the second exemplary embodiment of the present invention.

In the present exemplary embodiment, moreover, regarding the state transitions of HNB-T 3, a condition is added for transitioning directly from the "NULL" state to the "Support Mode Data Transfer Ready" state in the Iu-UP Protocol state transition chart of 3GPP TS25.415 (Non-Patent Document 2). FIG. 8 shows an image of the Iu-UP Protocol state transition chart that has been modified by the present exemplary embodiment. FIG. 8 shows that a transition occurs directly from the "NULL" state to the "Support Mode Data Transfer Ready" state upon reception of a RANAP: Relocation Request message that contains RFCI information ("Intra-HNB-GW Relocation-Req" in FIG. 8).

Thus, upon receiving a RANAP: Relocation Request message, HNB-T 3 takes this message as a trigger and causes the state of Iu-UP frame transfer unit 33B to transition from the "NULL" state to the "Support Mode Data Transfer Ready" state and thus enter a state that allows transfer of Iu-UP frame data even without executing the Iu-UP Initialization procedure.

In the present exemplary embodiment, the signal name that causes transition from the "NULL" state to the "Support Mode Data Transfer Ready" state is "Intra-HNB-GW Relocation-Req," but the signal name is not limited to this name.

The following Steps S203~S211 are well known as one proposal of an intra-HNB-GW relocation procedure that is currently being investigated in mobile communication systems made up of HNB/HNB-GW/CN and are not directly related to the present invention.

After execution of Step S202, HNB-T 3 responds to the RANAP: Relocation Request message by transmitting to HNB-GW 4 a RANAP: Relocation Request ACK message in Step S203.

HNB-GW 4 next instructs the start of Relocation by transmitting to HNB-S 2 a Relocation Command message in Step S204.

HNB-S 2 then instructs reconfiguration of the radio channel by transmitting to UE 1 an RRC: Reconfiguration message in Step S205.

In Step S206, HNB-T 3 next detects UE 1 by synchronization in radio Layer 1 and reports the detection of UE 1 by transmitting a Relocation Detect message to HNB-GW 4.

In Step S207, UE 1 next reports the completion of the assignment of radio resources by transmitting an RRC: Reconfiguration Complete message to HNB-T 3.

In Step S208, HNB-T 3 then reports the completion of Relocation by transmitting a RANAP: Relocation Complete message to HNB-GW 4.

HNB-GW 4 next requests release of the resources of HNB-S 2 by transmitting to HNB-S 2 a RANAP: Iu Release Command message in Step S209.

HNB-S 2 then reports that the resources of HNB-S 2 have been released by transmitting to HNB-GW 4 a RANAP: Iu Release Complete message in Step S210.

UE 1 subsequently transmits and receives voice data (user data) with HNB-GW 4 by way of HNB-T 3 in Step S211.

In the present exemplary embodiment as described hereinabove, HNB-S 2 reports the RFCI information of HNB-S 2 to HNB-GW 4 by means of a RANAP: Relocation Required message, and HNB-GW 4 reports the RFCI information of HNB-S 2 to HNB-T 3 by means of a RANAP: Relocation Request message, whereby HNB-T 3 is able to take over the RFCI information from HNB-S 2 without executing an Iu-UP Initialization procedure.

In addition, HNB-T 3 takes the reception of the RANAP: Relocation Request message from HNB-GW 4 as a trigger to transition to a state that allows the transfer of voice data, whereby voice data can be transmitted without executing an Iu-UP Initialization procedure.

Accordingly, HNB-T 3 is able to take over RFCI information from HNB-S 2 and transmit voice data without executing an Iu-UP Initialization procedure, whereby voice communication can be carried out while maintaining the transcoder-free operation (TrFO) unchanged even in the event of intra-HNB-GW relocation between HNB-S 2 and HNB-T 3.

In the present exemplary embodiment, moreover, because there is no need for executing an Iu-UP Initialization procedure, there is no need to modify the first provision that does not permit the restarting of Iu-UP Initialization from the same SRNS (HNB-GW 4) in 3GPP.

Further, in the present exemplary embodiment, an Iu-UP Initialization message need not be terminated at HNB-GW, and there is consequently no need to modify the second provision that does not permit an Iu-UP protocol message to be terminated in HNB-GW in 3GPP.

In addition, the present exemplary embodiment obtains the following two advantages due to the use of RANAP messages in reporting RFCI information:

(1) First Advantage

The termination of an RANAP message at an HNB and HNB-GW is prescribed by 3GPP TS25.467 (Non-Patent Document 4). As a result, the present exemplary embodiment has the advantage that when functions relating to the present exemplary embodiment are added in an RANAP message, there is no need for support by adding new protocol.

(2) Second Advantage

Although an intra-HNB-GW relocation procedure in 3GPP is currently being investigated, an RANAP message is typically used for signals of this procedure. Thus, by adding functions relating to the present exemplary embodiment to RANAP messages, the present exemplary embodiment has the advantage of eliminating the need to add new signals to the intra-HNB-GW relocation procedure.

Third Exemplary Embodiment

The present exemplary embodiment is an example in which the first exemplary embodiment is made more specific with higher-order apparatus 9 as HNB-GW 4.

In the present exemplary embodiment, the RFCI information of HNB-S 2 is reported from HNB-S 2 to HNB-T 3 by way of HNB-GW 4 by means of a Direct Transfer message of RANAP User Adaptation (hereinbelow abbreviated as "RUA").

RUA is defined in 3GPP TS 25.468 (Non-Patent Document 5). In addition, an RUA Direct Transfer message is a message used for transferring an RANAP message.

Figure 9:
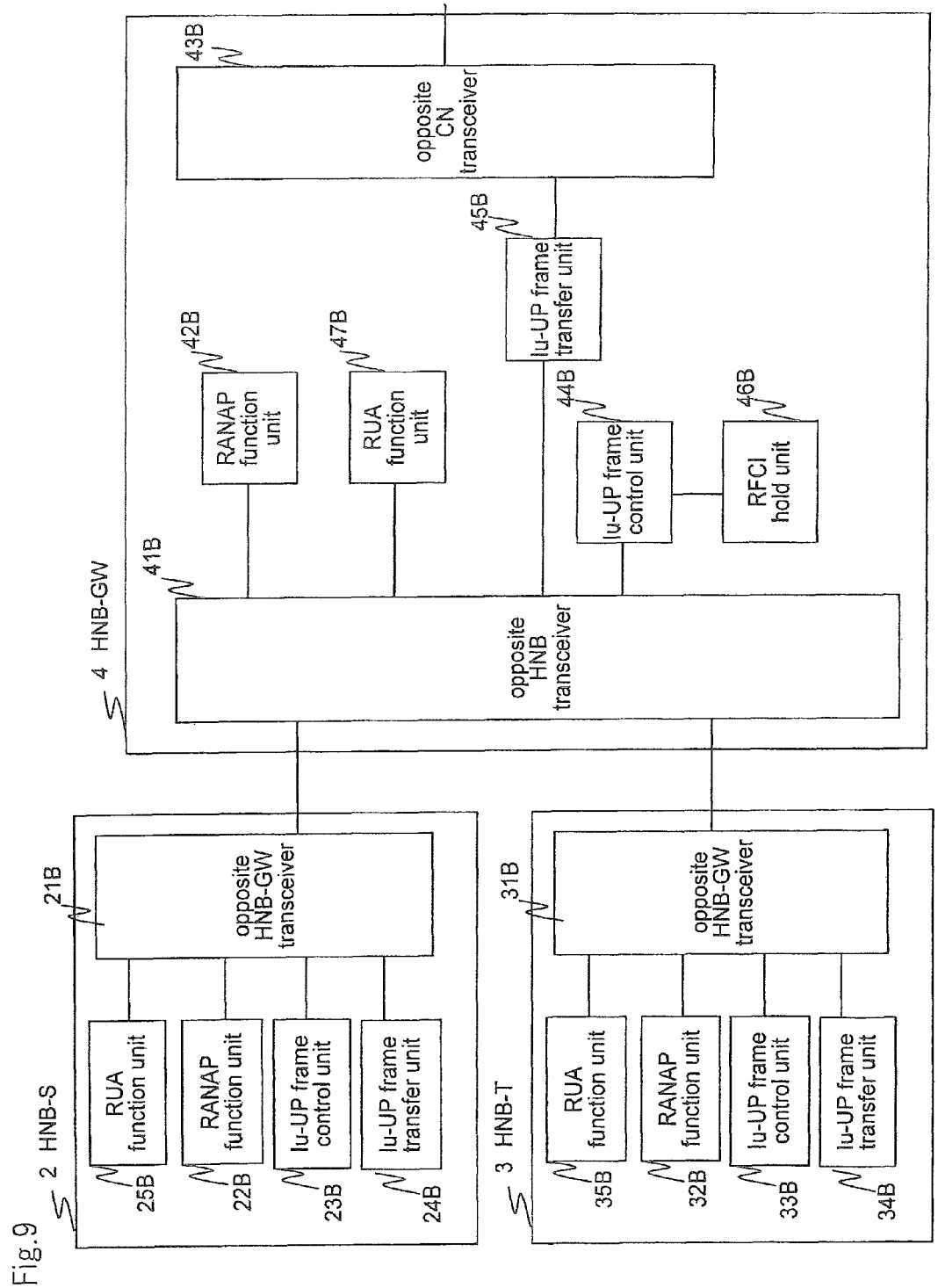
FIG. 9 is a block diagram showing the internal configuration of the HNB and HNB-GW in the mobile communication system of the third exemplary embodiment of the present invention.

Referring to FIG. 9, HNB-GW 4 of the present exemplary embodiment differs from HNB-GW 4 of the second exemplary embodiment shown in FIG. 4 in that RUA function unit 47B has been added. RUA function unit 47B is one constituent element that makes up control unit 92A of FIG. 2.

HNB-S 2 of the present exemplary embodiment differs from HNB-S 2 of the second exemplary embodiment shown in FIG. 4 in that RUA function unit 25B has been added. RUA function unit 25B is one constituent element that makes up control unit 21A of FIG. 2.

HNB-T 3 of the present exemplary embodiment differs from HNB-T 3 of the second exemplary embodiment shown in FIG. 4 in that RUA function unit 35B has been added. RUA function unit 35B is one constituent element that makes up control unit 32A of FIG. 2.

RUA function units 25B, 35B, and 47B realize RUA protocol functions prescribed by 3GPP TS 25.468 (Non-Patent Document 5). For example, RUA function units 25B, 35B, and 47B have the function of generating RUA messages and the function of terminating RUA messages.

Figure 10:
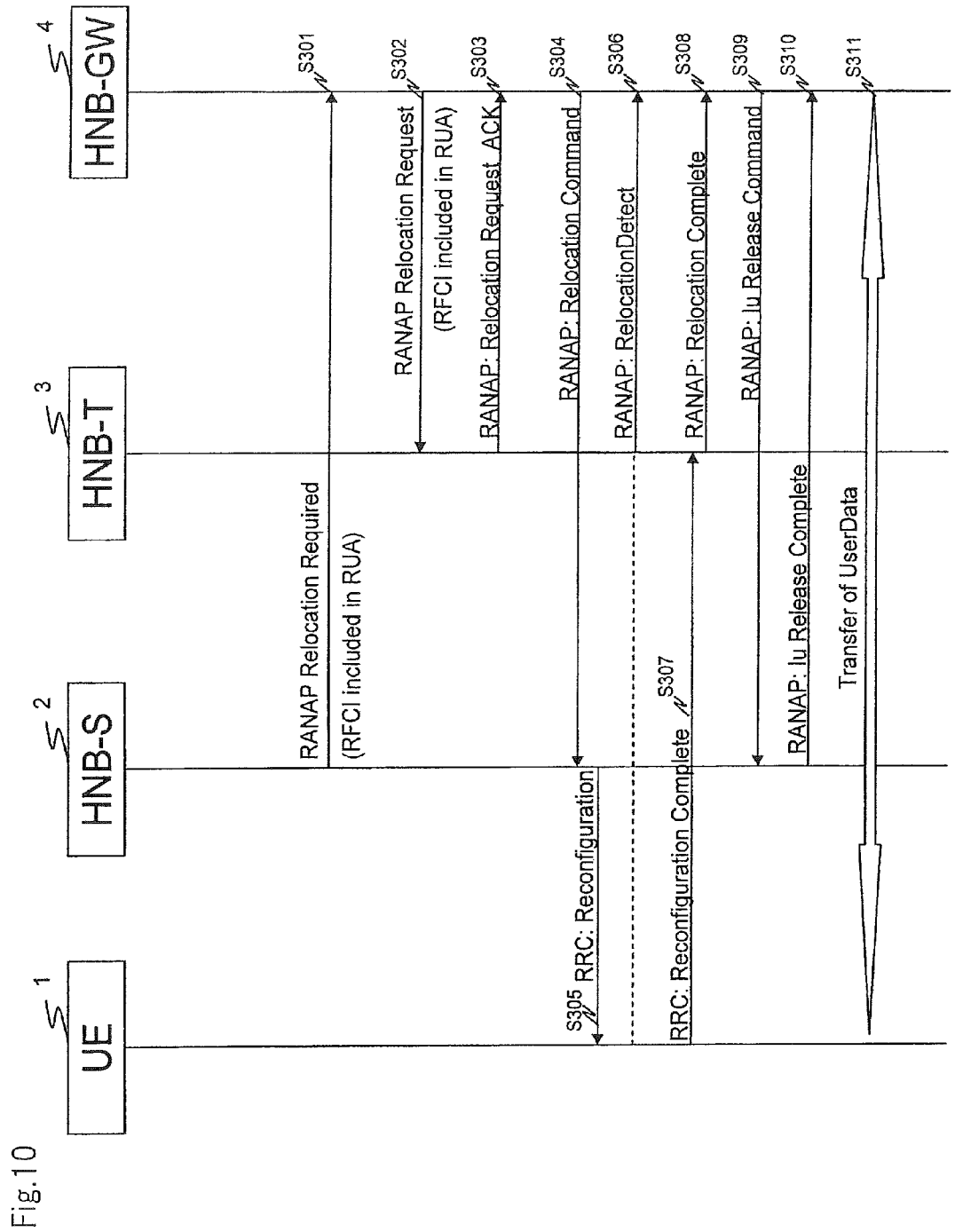
FIG. 10 is a sequence chart for explaining the operation of the mobile communication system of the third exemplary embodiment of the present invention.

The operations of the present exemplary embodiment are next described in conjunction with the sequence chart shown in FIG. 10.

In Step S301, HNB-S 2 first starts a Relocation procedure by transmitting to HNB-GW 4 an RANAP: Relocation Required message that requests the movement of UE 1 from HNB-S 2.

At the time of transmitting an RANAP: Relocation Required message in the present exemplary embodiment, an RUA Direct Transfer message for transferring this RANAP: Relocation Required message is transmitted at the same time.

Still further, in the present exemplary embodiment, RFCI information of an Iu-UP Init message is added in the RUA Direct Transfer message of 9.1.4 of 3GPP TS 25.468 (Non-Patent Document 5). FIG. 11 shows an RUA Direct Transfer message that has been modified by the present exemplary embodiment. FIG. 11 shows only those points that have been modified. In the RUA Direct Transfer message of the present exemplary embodiment, "RFCI" that is an RFCI value, "RCFI Subflow" that is the number of subflows that make up the data frames that are indicated by RFCI values, and "Length of Subflow" that is the data size of each subflow are added as RFCI information.

HNB-GW 4 both terminates RANAP: Relocation Required messages at RANAP function unit 42B and terminates RUA Direct Transfer messages at RUA function unit 47B and obtains RFCI information.

In Step S302, HNB-GW 4 further requests the securing of the resources of HNB-T 3 by transmitting to HNB-T 3 an RANAP: Relocation Request message requesting the movement of UE 1 to HNB-T 3.

In the present exemplary embodiment, at the time of transmitting an RANAP: Relocation Request message, an RUA Direct transfer message for transferring this RANAP: Relocation Request message is transmitted at the same time.

In the present exemplary embodiment, moreover, when RFCI information is contained in the RUA Direct Transfer message in Step S301, RUA function unit 47B obtains the RFCI information and includes this RFCI information in an RUA Direct Transfer message. The RUA Direct Transfer message at this time is the same as the message shown in FIG. 11.

HNB-T 3 both terminates the RANAP: Relocation Request message in RANAP function unit 32B and terminates the RUA Direct Transfer message in RUA function unit 35B. If RFCI information is contained in this RUA Direct Transfer message, HNB-T 3 initializes the RFCI information of HNB-T 3 and resets it to the RFCI information that is contained in the RUA Direct Transfer message.

In this way, when HNB-T 3 subsequently receives uplink voice data from UE 1 and downlink voice data from CN 6, HNB-T 3 is able to correctly recognize not only the structure of the data frames of the voice data but also the rate by means of the RFCI values that are appended to the voice data.

In the present exemplary embodiment, moreover, in the state transition chart (see FIG. 8) of Iu-UP Protocol of 3GPP TS 25.415 (Non-Patent Document 2) relating to the state transitions of HNB-T 3, a condition is added that an RUA Direct Transfer message that contains RFCI information (represented as "Intra-HNB-GW Relocation-Req" in FIG. 8) be received as a condition for transitioning directly from the "NULL" state to the "Support Mode Data Transfer Ready" state.

In this way, HNB-T 3 takes the reception of an RUA Direct Transfer message as a trigger for causing the state of Iu-UP frame transfer unit 33B to transition from the "NULL" state to the "Support Mode Data Transfer Ready" state to enter a state that allows transfer of Iu-UP frame data without executing an Iu-UP Initialization procedure.

The processing of the following Steps S303~S311 is the same as the processing of Steps S203~S211 of FIG. 5.

In the present exemplary embodiment as described hereinabove, HNB-S 2 reports the RFCI information of HNB-S 2 to HNB-GW 4 by means of an RUA Direct Transfer message and HNB-GW 4 reports the RFCI information of HNB-S 2 to HNB-T 3 by means of an RUA Direct Transfer message, whereby HNB-T 3 is able to take over the RFCI information from HNB-S 2 without executing an Iu-UP Initialization procedure.

In addition, HNB-T 3 takes the reception of an RUA Direct Transfer message from HNB-GW 4 as a trigger for transitioning to a state that allows the transfer of voice data, whereby voice data can be transmitted without executing an Iu-UP Initialization procedure.

Accordingly, HNB-T 3 is able to take over the RFCI information from HNB-S 2 and transmit voice data without executing an Iu-UP Initialization procedure, whereby voice communication can be carried out while maintaining transcoder-free operation (TrFO) without change even in the event of an intra-HNB-GW relocation between HNB-S 2 and HNB-T 3.

In addition, in the present exemplary embodiment, because there is no need for executing an Iu-UP Initialization procedure, there is no need to modify the first provision in 3GPP that does not permit restarting of Iu-UP Initialization from the same SRNS (HNB-GW 4).

Still further, in the present exemplary embodiment, because there is no need to terminate an Iu-UP Initialization message at an HNB-GW, there is also no need to modify the second provision that does not permit terminating an Iu-UP protocol message at an HNB-GW.

Fourth Exemplary Embodiment

The present exemplary embodiment is an example in which the first exemplary embodiment is made more specific with higher-order apparatus 9 as HNB-GW 4.

In the present exemplary embodiment, the RFCI information of HNB-S 2 is reported from HNB-S 2 to HNB-T 3 by way of HNB-GW 4 by means of a Home Node B Application Part (hereinbelow abbreviated as "HNBAP") Relocation message.

An HNBAP is defined in 3GPP TS 25.469 (Non-Patent Document 6). An HNBAP Relocation message is not prescribed in 3GPP but is well known as one plan in intra-HNB-GW relocation procedures that are currently being investigated. HNBAP Relocation messages have no direct relation to the present invention.

Figure 12:
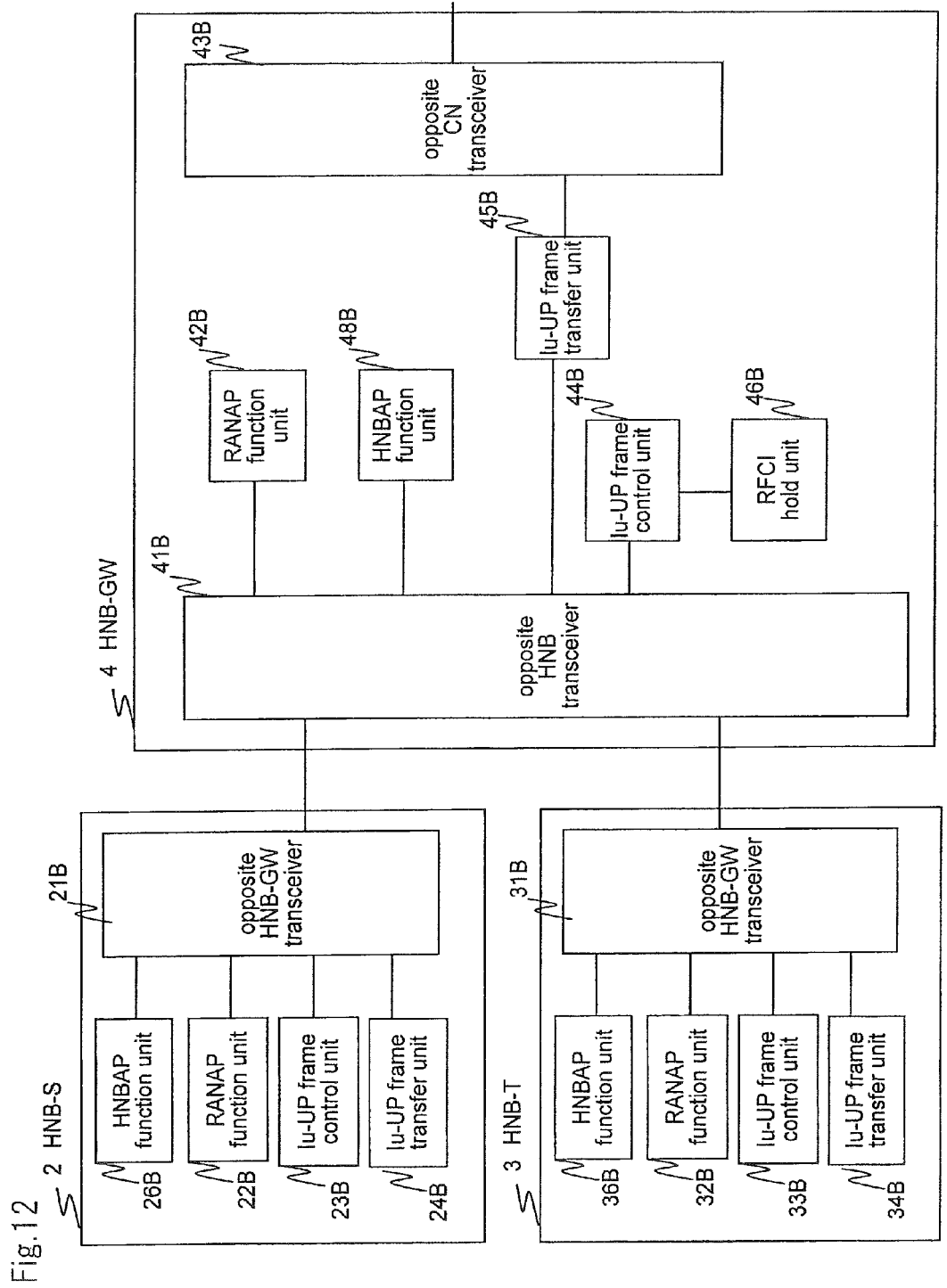
FIG. 12 is a block diagram showing the internal configuration of the HNB and HNB-GW in the mobile communication system of the fourth exemplary embodiment of the present invention.

Referring to FIG. 12, HNB-GW 4 of the present exemplary embodiment differs from HNB-GW 4 of the second exemplary embodiment shown in FIG. 4 in that HNBAP function unit 48B has been added. HNBAP function unit 48B is one constituent element that makes up control unit 92A of FIG. 2.

In addition, HNB-S 2 of the present exemplary embodiment differs from HNB-S 2 of the second exemplary embodiment shown in FIG. 4 in that HNBAP function unit 26B has been added. HNBAP function unit 26B is one constituent element that makes up control unit 21A of FIG. 2.

HNB-T 3 of the present exemplary embodiment differs from HNB-T 3 of the second exemplary embodiment shown in FIG. 4 in that HNBAP function unit 36B has been added. HNBAP function unit 36B is one constituent element that makes up control unit 32A of FIG. 2.

HNBAP function units 26B, 36B, and 48B execute the HNBAP protocol functions prescribed in 3GPP TS 25.469 (Non-Patent Document 6). For example, HNBAP function units 26B, 36B, and 48B have a function of generating HNBAP messages and a function of terminating HNBAP messages.

Figure 13:
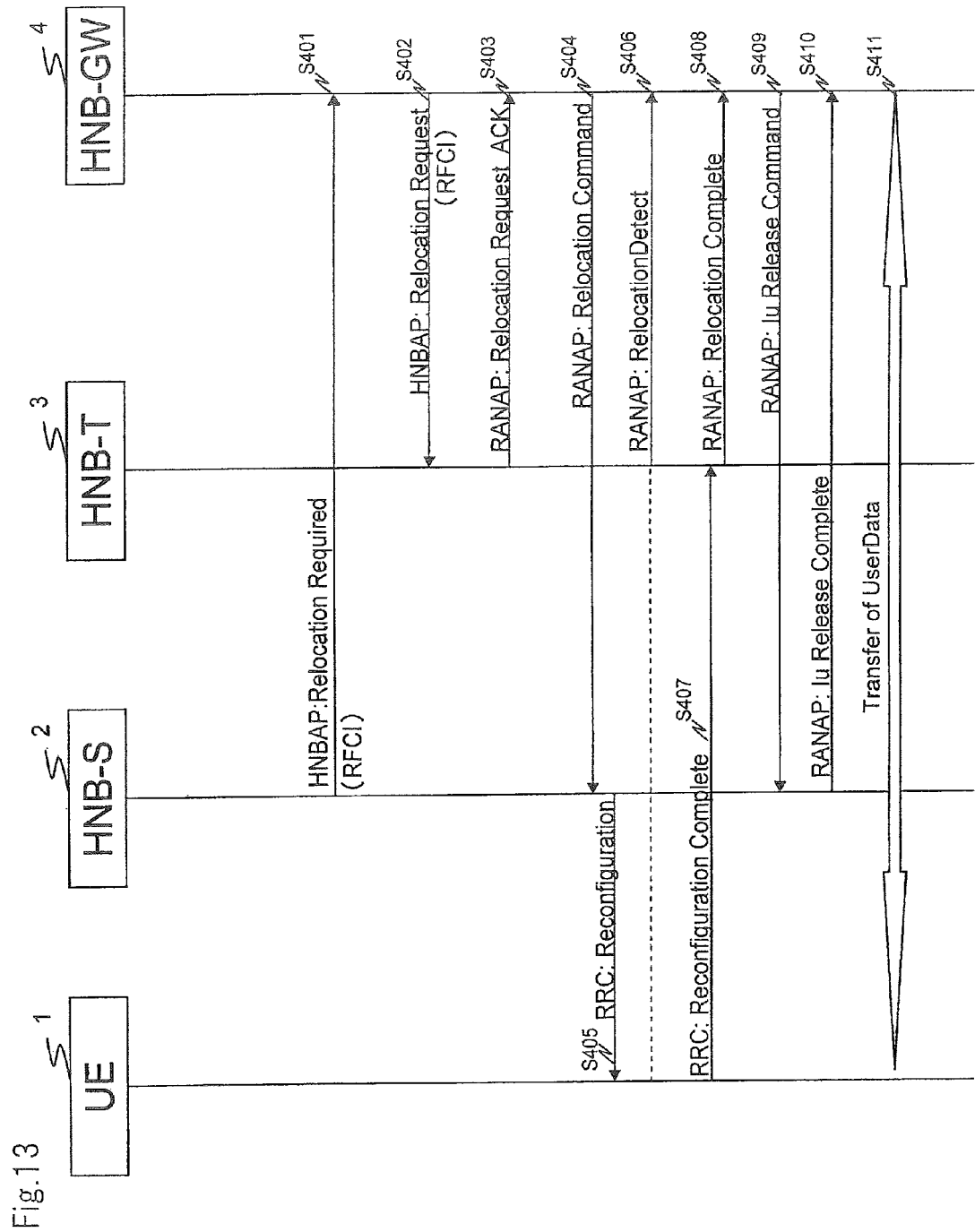
FIG. 13 is a sequence chart for explaining the operation of the mobile communication system of the fourth exemplary embodiment of the present invention.

The operations of the present exemplary embodiment are next described in conjunction with the sequence chart shown in FIG. 13.

In Step S401, HNB-S 2 first starts the Relocation procedure by transmitting to HNB-GW 4 an HNBAP: Relocation Required message that requests movement of UE 1 from HNB-S 2.

In the present exemplary embodiment, RFCI information of an Iu-UP Init message is added in this HNBAP: Relocation Required message. RFCI information can be added to the HNBAP: Relocation Required message at this time, similar to, for example, FIG. 11.

HNB-GW 4 terminates the HNBAP: Relocation Required message at HNBAP function unit 48B and obtains the RFCI information.

In Step S402, HNB-GW 4 further requests the securing of the resources of HNB-T 3 by transmitting to HNB-T 3 an HNBAP: Relocation Request message that requests the movement of UE 1 to HNB-T 3.

In the present exemplary embodiment, when RFCI information is contained in the HNBAP: Relocation Required message in Step S401, HNBAP function unit 48B obtains the RFCI information and includes this RFCI information in the HNBAP: Relocation Request message. RFCI information can be added to the HNBAP: Relocation Request message at this time, for example, as in FIG. 11.

HNB-T 3 terminates the HNBAP: Relocation Request message at HNBAP function unit 36B. If RFCI information was contained in this HNBAP: Relocation Request message, HNB-T 3 initializes the RFCI information of HNB-T 3 and resets it to the RFCI information that is contained in the HNBAP: Relocation Request message.

In this way, upon subsequently receiving uplink voice data from UE 1 and downlink voice data from CN 6, HNB-T 3 is able to correctly recognize by means of the RFCI values appended to the voice data not only the structure of the data frames of the voice data but also the rate.

Still further, in the present exemplary embodiment, in the state transition chart (see FIG. 8) of Iu-UP protocol of 3GPP TS 25.415 (Non-Patent Document 2) relating to the state transitions of HNB-T 3, a condition is added that an HNBAP: Relocation Request message that contains RFCI information (shown as "Intra-HNB-GW Relocation-Req" in FIG. 8) be received as a condition for transitioning directly from the "NULL" state to the "Support Mode Data Transfer Ready" state.

In this way, HNB-T 3 takes the reception of an HNBAP: Relocation Request message as a trigger to cause the state of Iu-UP frame transfer unit 33B to transition from the "NULL" state to the "Support Mode Data Transfer Ready" state and thus enter a state that allows transfer of Iu-UP frame data without executing an Iu-UP Initialization procedure.

The processing of succeeding Steps S403~S411 is similar to the processing of Steps S203~211 of FIG. 5.

In the present exemplary embodiment as described hereinabove, HNB-S 2 reports the RFCI information of HNB-S 2 to HNB-GW 4 by means of an HNBAP: Relocation Required message, and HNB-GW 4 reports the RFCI information of HNB-S 2 to HNB-T 3 by means of an HNBAP: Relocation Request message, whereby HNB-T 3 is able to take over the RFCI information from HNB-S 2 without executing an Iu-UP Initialization procedure.

In addition, HNB-T 3 takes the reception of an HNBAP: Relocation Request message from HNB-GW 4 as a trigger for transitioning to a state that allows transfer of voice data, whereby voice data can be transmitted without executing an Iu-UP Initialization procedure.

Accordingly, HNB-T 3 is able to take over the RFCI information from HNB-S 2 and transmit voice data without executing an Iu-UP Initialization procedure, and voice communication can therefore be carried out while maintaining transcoder-free operation (TrFO) unchanged even in the event of an intra-HNB-GW relocation between HNB-S 2 and HNB-T 3.

In addition, the elimination of the need to execute an Iu-UP Initialization procedure in the present exemplary embodiment further eliminates the need to modify the first provision that does not permit reactivation of Iu-UP Initialization from the same SRNS (HNB-GW 4) in 3GPP.

Still further, the elimination of the need to terminate an Iu-UP Initialization message in an HNB-GW in the present exemplary embodiment eliminates the need to modify the second provision that does not permit the termination of an Iu-UP protocol message in an HNB-GW in 3GPP.

Fifth Exemplary Embodiment

The present exemplary embodiment is an example in which the first exemplary embodiment is made more specific with higher-order apparatus 9 as HNB-GW 4. In addition, the configuration of the present exemplary embodiment is similar to the configuration of the second exemplary embodiment shown in FIG. 4.

IN the present exemplary embodiment, HNB-GW 4 reports the RFCI information of HNB-S 2 to HNB-T 3 by means of an Iu-UP Init message at the time of processing Relocation of UE 1 from HNB-S 2 to HNB-T 3. The Iu-UP Init message is a message that is transmitted and received between an HNB and HNB-GW when an HNB attempts to establish communication with the HNB that has the terminal of the communication partner of the UE under its control at times of, for example, the occurrence of Relocation.

In Iu-UP Ver2 of 3GPP TS 25.415 (Non-Patent Document 2), the transmission of an Iu-UP Init message from a CN to an RNC is prescribed. However, this prescription assumes a mobile communication system that is made up of existing 3GPP Node-B/RNC/CN.

As a result, the transmission of an Iu-UP Init message from CN to HNB-GW must be made possible even in a mobile communication system that is made up of HNB/HNB-GW/CN, but 3GPP TS 25.467 (Non-Patent Document 4) stipulates that a message of Iu-UP protocol not be terminated at an HNB-GW.

The present exemplary embodiment therefore modifies the provisions of 3GPP and permits the termination of an Iu-UP message at an HNB-GW.

Figure 14:
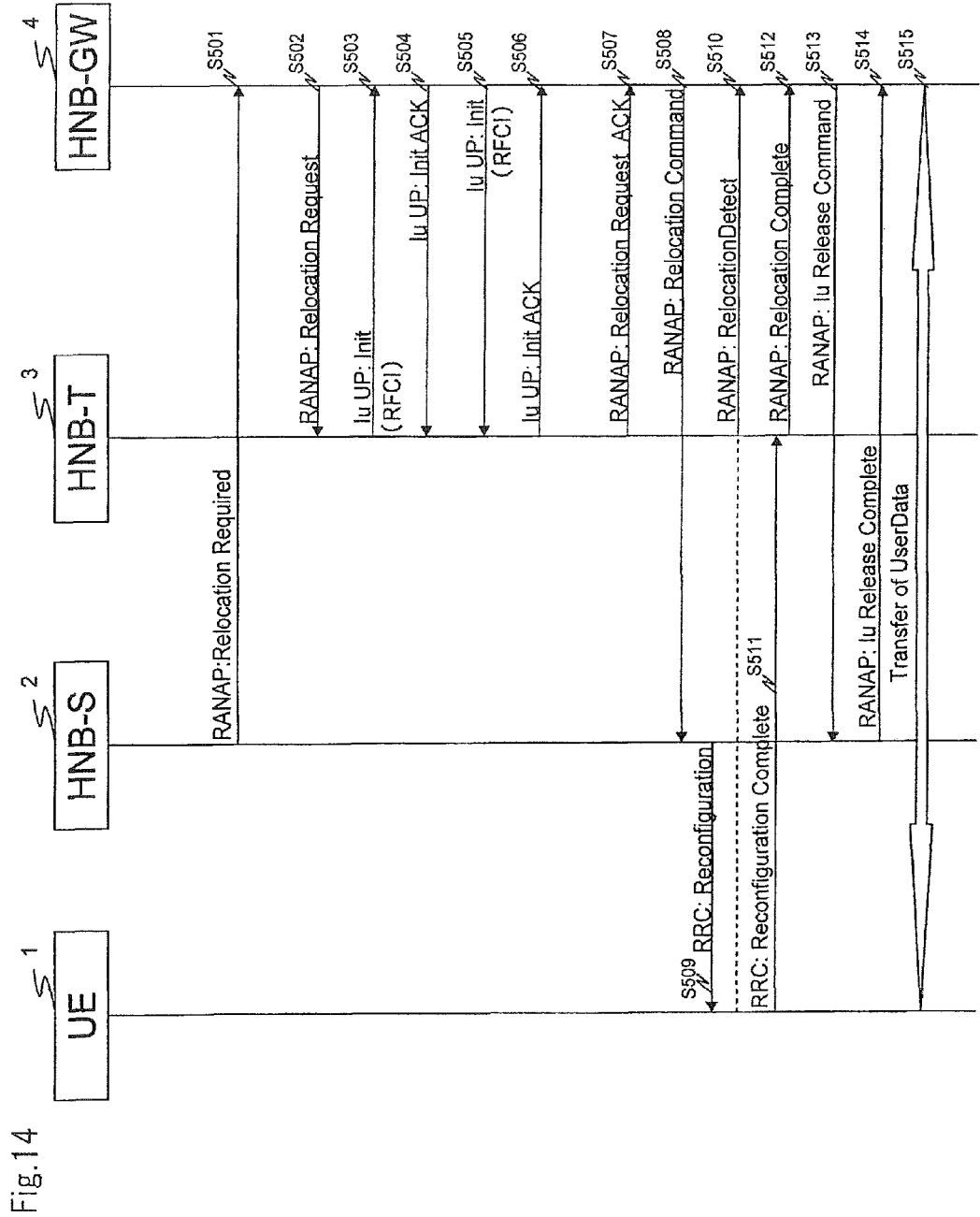
FIG. 14 is a sequence chart for explaining the operation of the mobile communication system of the fifth exemplary embodiment of the present invention.

The operations of the present exemplary embodiment are next described in conjunction with the sequence chart of FIG. 14.

In FIG. 14, HNB-GW 4 is assumed to have obtained the RFCI information of HNB-S 2 in advance. In other words, HNB-S 2 has transmitted an Iu-UP Init message that contains the RFCI information of HNB-S 2 to HNB-GW 4 at the time that communication is established between HNB-S 2 and HNB-X 8, whereby HNB-GW 4 has obtained the RFCI information of HNB-S 2. This procedure is implemented before Step S501 of FIG. 14 and is not described in FIG. 14.

First, the processing of Steps S501 and S502 that is similar to the processing of Steps S201 and S202 of FIG. 5 is carried out.

In Step S503, HNB-T 3 next transmits an Iu-UP Init message that contains the RFCI information of HNB-T 3 to HNB-GW 4. HNB-GW 4 terminates the Iu-UP Init message in Iu-UP frame control unit 44B and compares the RFCI information of HNB-T 3 that is contained in the Iu-UP Init message with the RFCI information of HNB-S 2 that was obtained beforehand.

In Step S504, HNB-GW 4 next responds to the Iu-UP Init message by transmitting an Iu-UP Init ACK message to HNB-T 3.

If the RFCI information of HNB-S 2 and the RFCI information of HNB-T 3 do not match in Step S503, HNB-GW 4 transmits an Iu-UP Init message that contains the RFCI information of HNB-S 2 to HNB-T 3 in Step S505 to cause the RFCI information of HNB-T 3 to match the RFCI information of HNB-S 2.

In Step S506, HNB-T 3 next responds to the Iu-UP Init message by transmitting an Iu-UP Init ACK message to HNB-GW 4. In addition, HNB-T 3 initializes the RFCI information of HNB-T 3 and resets it to the RFCI information of HNB-S 2 that is contained in the Iu-UP Init message.

The processing of succeeding Steps S507~S515 is similar to the processing of Steps S203~S211 of FIG. 5.

In the present exemplary embodiment as described hereinabove, HNB-GW 4 reports the RFCI information of HNB-S 2 to HNB-T 3 by means of an Iu-UP Init message, whereby HNB-T 3 is able to take over the RFCI information from HNB-S 2.

Accordingly, voice communication can be carried out while maintaining transcoder-free operation (TrFO) unchanged even in the event of an intra-HNB-GW relocation between HNB-S 2 and HNB-T 3.

The description in 7.2 of 3GPP TS 25.467 (Non-Patent Document 4) that is modified by the present exemplary embodiment is as shown below.

Iu-UP is terminated only at CN, HNB, and HNB-GW.

The description of Iu-UP Ver2 in 6.5.2 of 3GPP TS 25.415 (Non-Patent Document 2) that is modified by the present exemplary embodiment is as shown below.

The initialization procedure can be controlled at two Iu access points, i.e., both CN and UTRAN.

An Initialization procedure is activated when indicated by the control function of Iu-UP procedures, i.e., at the time of relocation of SRNS or when RAB is established on Iu, or when a CN or HNB-GW attempts to resolve nonmatching of RFCI in the state of carrying out TrFO. The Initialization procedure cannot be restarted by an SRNC for RAB without requesting RAB Modification by means of an RANAP.

Although the transmission of an Iu-UP Init message from an RNC to a CN is prescribed in Iu-UP Ver1 of 3GPP TS 25.415 (Non-Patent Document 2), the transmission of an Iu-UP Init message from a CN to an RNC is not prescribed. The prescription for Iu-UP Ver1 may be amended similarly to Iu-UP Ver2.

In this case, the description of Iu-UP Ver1 in 6.5.2 of 3GPP TS 25.415 (Non-Patent Document 2) that is modified by the present exemplary embodiment is as shown below.

The Initialization procedure can be controlled at two Iu access points, i.e., both CN and UTRAN.

The Initialization procedure is activated at the time indicated by the control function of the Iu-UP procedure, i.e., at the time of relocation of an SRNS or when establishing RAB on Iu, or when a CN or an HNB-GW attempts to resolve nonmatching of RFCI in a state of carrying out TrFO. The Initialization procedure cannot be restarted by SRNC for RAB without requesting RAB Modification by means of an RANAP.

Sixth Exemplary Embodiment

The present exemplary embodiment is an example in which the first exemplary embodiment has been made more specific with higher-order apparatus 9 as CN node 5.

In the present exemplary embodiment, CN node 5 reports the RFCI information of HNB-S 2 to HNB-T 3 by means of an Iu-UP Init message at the time of processing Relocation of UE 1 from HNB-S 2 to HNB-T 3.

In other words, in the present exemplary embodiment, CN node 5 carries out operations that were carried out by HNB-GW 4 in the third exemplary embodiment, and HNB-GW 4 carries out only transfer without terminating RANAP messages and Iu-UP Init messages that are exchanged between HNB-S 2/HNB-T 3 and CN node 5.

However, the current 3GPP TS 25.415 (Non-Patent Document 2) stipulates that the restarting of Iu-UP Initialization at the time of occurrence of an intra-HNB-GW relocation is not permitted.

In response, the provisions of 3GPP are modified in the present exemplary embodiment, and the reactivation of Iu-UP Initialization is permitted even in the event of an intra-HNB-GW relocation.

Figure 15:
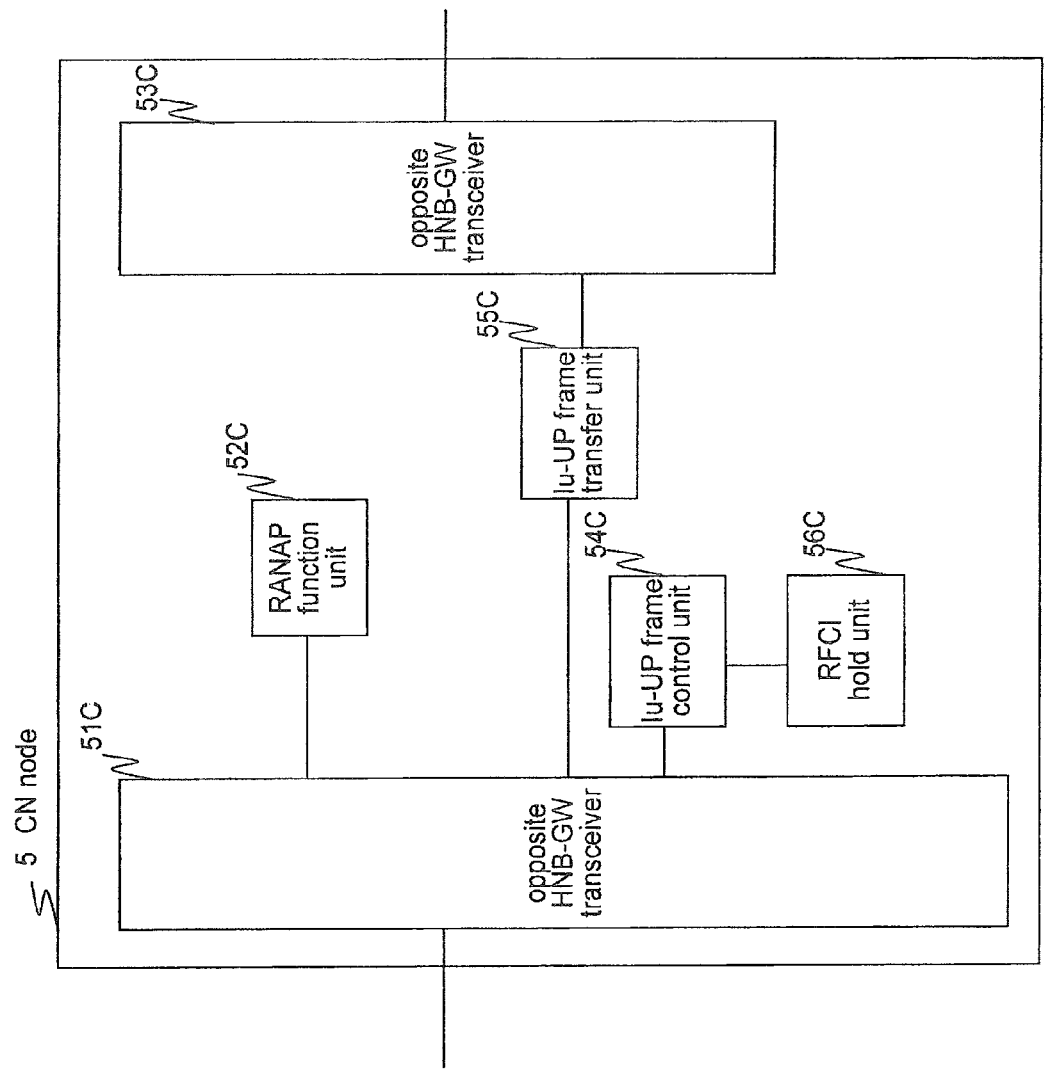
FIG. 15 is a block diagram showing the internal configuration of the CN node in the mobile communication system of the sixth exemplary embodiment of the present invention.

Referring to FIG. 15, CN node 5 of the present exemplary embodiment includes: opposite HNB-GW transceiver 51C for HNB-GW 4, RANAP function unit 52C, opposite HNB-GW transceiver 53C for HNB-GW 7, Iu-UP frame control unit 54C, Iu-UP frame transfer unit 55C, and RFCI hold unit 56C. In FIG. 15, moreover, opposite HNB-GW transceiver 51C makes up transceiver unit 91A of FIG. 2, and the other function blocks make up control unit 92A of FIG. 2.

In addition, the configurations of HNB-S 2 and HNB-T 3 of the present exemplary embodiment are similar to the configurations of HNB-S 2 and HNB-T 3 of the second exemplary embodiment shown in FIG. 4.

Opposite HNB-GW transceiver 51C has an interface for connecting with HNB-GW 4 and transmits and receives voice data with HNB-GW 4.

Opposite HNB-GW transceiver 53C has an interface for connecting with HNB-GW 7 and transmits and receives voice data with HNB-GW 7.

The remaining RANAP function unit 52C, Iu-UP frame control unit 54C, Iu-UP frame transfer unit 55C, and RFCI hold unit 56C perform operations similar to RANAP function unit 42B, Iu-UP frame control unit 44B, Iu-UP frame transfer unit 45B, and RFCI hold unit 46B, respectively, shown in FIG. 4.

Figure 16:
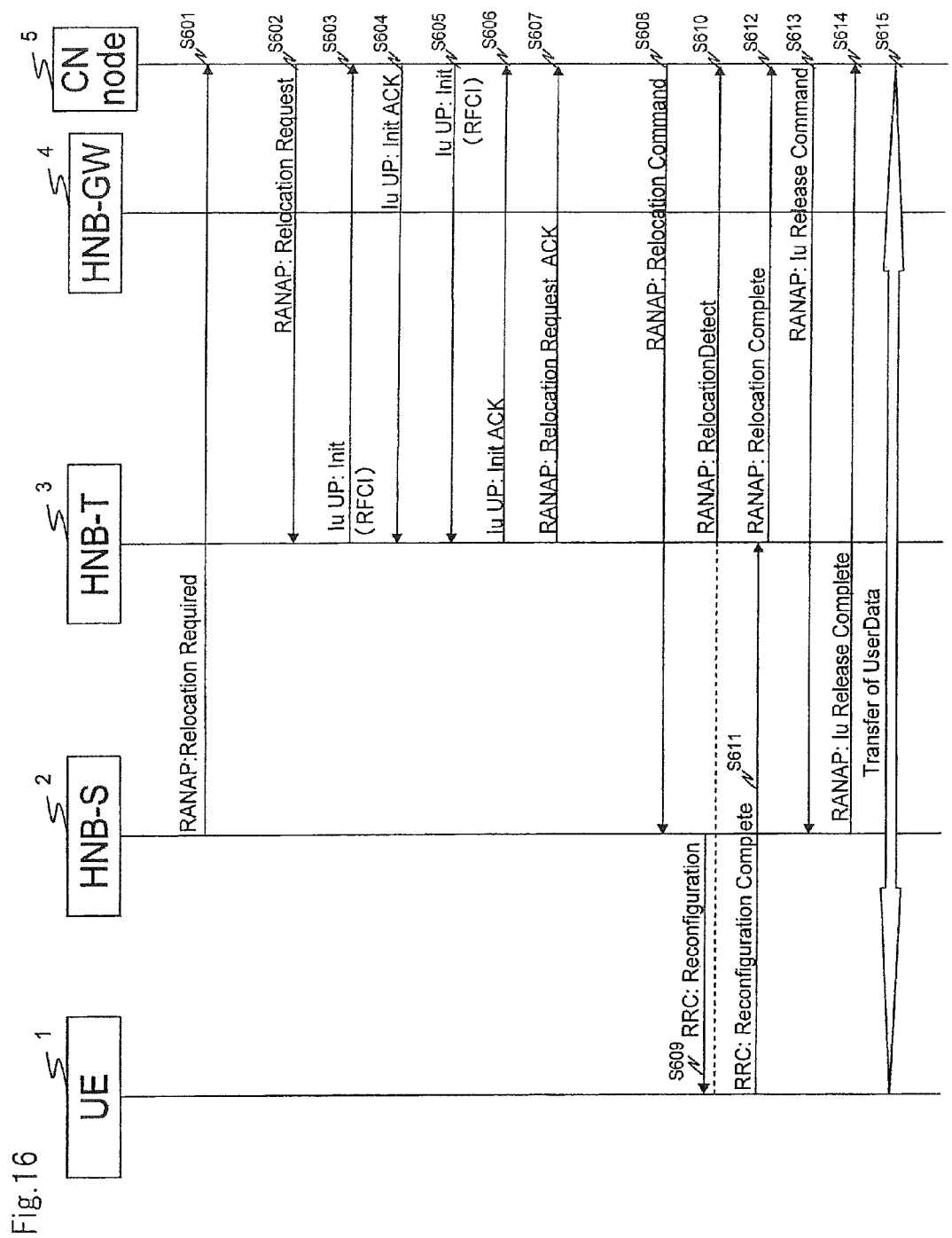
FIG. 16 is a sequence chart for explaining the operation of the mobile communication system of the sixth exemplary embodiment of the present invention.

The operations of the present exemplary embodiment are next described in conjunction with the sequence chart shown in FIG. 16.

In FIG. 16, it is assumed that CN node 5 has obtained the RFCI information of HNB-S 2 in advance. In other words, at the time that communication is established between HNB-S 2 and HNB-X 8, HNB-S 2 transmits an Iu-UP Init message that contains the RFCI information of HNB-S 2 to CN node 5 by way of HNB-GW 4, whereby CN node 5 obtains the RFCI information of HNB-S 2. This procedure is implemented before Step S601 of FIG. 16 and is not shown in FIG. 16.

First, processing that is similar to the processing carried out by HNB-S 2, HNB-T 3, and HNB-GW 4 in Steps S201 and S202 of FIG. 5 is carried out by HNB-S 2, HNB-T 3, and CN node 5 in Steps S601 and S602.

HNB-T 3 next transmits an Iu-UP Init message that contains the RFCI information of HNB-T 3 to CN node 5 by way of HNB-GW 4 in Step S603. CN node 5 terminates the Iu-UP Init message at Iu-UP frame control unit 54C and compares the RFCI information of HNB-T 3 that is contained in the Iu-UP Init message with the RFCI information of HNB-S 2 that was obtained in advance.

In Step S604, CN node 5 next responds to the Iu-UP Init message by transmitting an Iu-UP Init ACK message to HNB-T 3 by way of HNB-GW 4.

If the RFCI information of HNB-S 2 and the RFCI information of HNB-T 3 do not match in Step S603, CN node 5 transmits an Iu-UP Init message that contains the RFCI information of HNB-S 2 to HNB-T 3 by way of HNB-GW 4 in Step S605 to cause the RFCI information of HNB-T 3 to match the RFCI information of HNB-S 2.

In Step S606, HNB-T 3 next responds to the Iu-UP Init message by transmitting an Iu-UP Init ACK message to CN node 5 by way of HNB-GW 4. In addition, HNB-T 3 initializes the RFCI information of HNB-T 3 and resets it to the RFCI information of HNB-S 2 that is contained in the Iu-UP Init message.

The processing that is carried out by UE 1, HNB-S 2, HNB-T 3, and CN node 5 in the subsequent Steps S607~S615 is similar to the processing that was carried out by UE 1, HNB-S 2, HNB-T 3, and HNB-GW 4 in Steps S203~S211 of FIG. 5.

In the present exemplary embodiment as described hereinabove, CN node 5 reports the RFCI information of HNB-S 2 to HNB-T 3 by means of an Iu-UP Init message, whereby HNB-T 3 is able to take over the RFCI info' nation from HNB-S 2.

Accordingly, voice communication can be carried out while maintaining transcoder-free operation (TrFO) unchanged even in the event of an intra-HNB-GW relocation between HNB-S 2 and HNB-T 3.

In addition, the description of Iu-UP Ver1 in 6.5.2 of 3GPP TS 25.415 (Non-Patent Document 2) that is modified by the present exemplary embodiment is as follows:

The Initialization procedure cannot be reactivated for RAB without requesting RAB Modification by means of an RANAP or without the occurrence of intra-HNB-GW relocation.

In addition, the description of Iu-UP Ver2 at 6.5.2 of 3GPP TS 25.415 (Non-Patent Document 2) that is modified by the present exemplary embodiment is as follows:

The Initialization procedure cannot be reactivated for RAB without requesting RAB Modification by means of an RANAP or without the occurrence of intra-HNB-GW relocation.

Seventh Exemplary Embodiment

The mobile communication system of the present exemplary embodiment is characterized by HNB-S 2, HNB-T 3, and HNB-GW 4.

In the present exemplary embodiment, each of HNB-S 2 and HNB-T 3 reports RFCI information to HNB-GW 4, and when the RFCI information of HNB-S 2 and the RFCI information of HNB-T 3 do not match, HNB-GW 4 converts the RFCI values that are appended to voice data received from HNB-T 3 to RFCI values that indicate data frames that have the same structure in the RFCI information of HNB-S 2.

Figure 17:
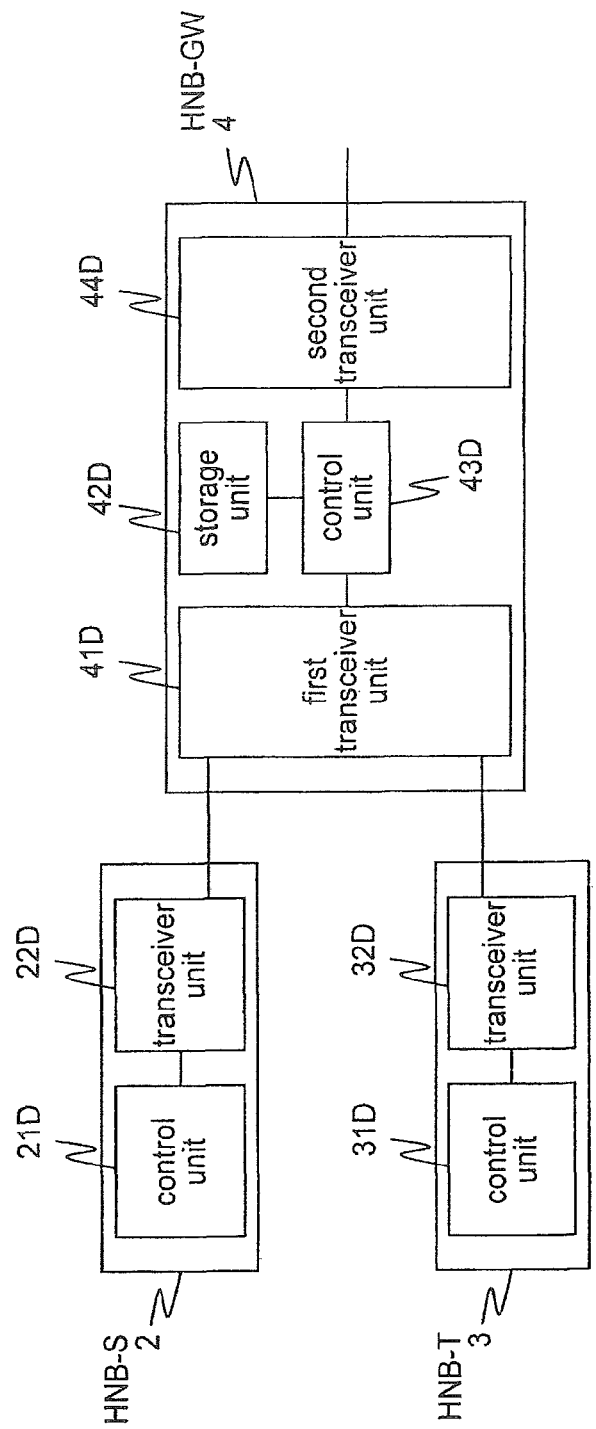
FIG. 17 is a block diagram showing the internal configuration of the HNB and HNB-GW in the mobile communication system of the seventh exemplary embodiment of the present invention.

Referring to FIG. 17, HNB-S 2 of the present exemplary embodiment includes: control unit 21D that includes the RFCI information of HNB-S 2 in a first message, and transceiver unit 22D that transmits this first message to HNB-GW 4.

In addition, HNB-T 3 of the present exemplary embodiment includes: control unit 31D that includes the RFCI information of HNB-T 3 in a second message, and transceiver unit 32D that transmits this second message to HNB-GW 4.

HNB-GW 4 of the present exemplary embodiment includes: first transceiver unit 41D that both receives a first message from HNB-S 2 and receives a second message from HNB-T 3; storage unit 42D that stores RFCI information of HNB-S 2 that is contained in the first message and RFCI information of HNB-T 3 that is contained in the second message; control unit 43D that, when the RFCI information of HNB-S 2 and the RFCI information of HNB-T 3 do not match, upon subsequent reception of voice data from HNB-T 3, converts the RFCI values that are appended to the voice data to RFCI values that indicate data frames having the same construction as the voice data in the RFCI information of HNB-S 2; and second transceiver unit 44D that transmits to CN 6 the voice data to which have been appended the RFCI values that underwent RFCI-conversion in control unit 43D.

Figure 18:
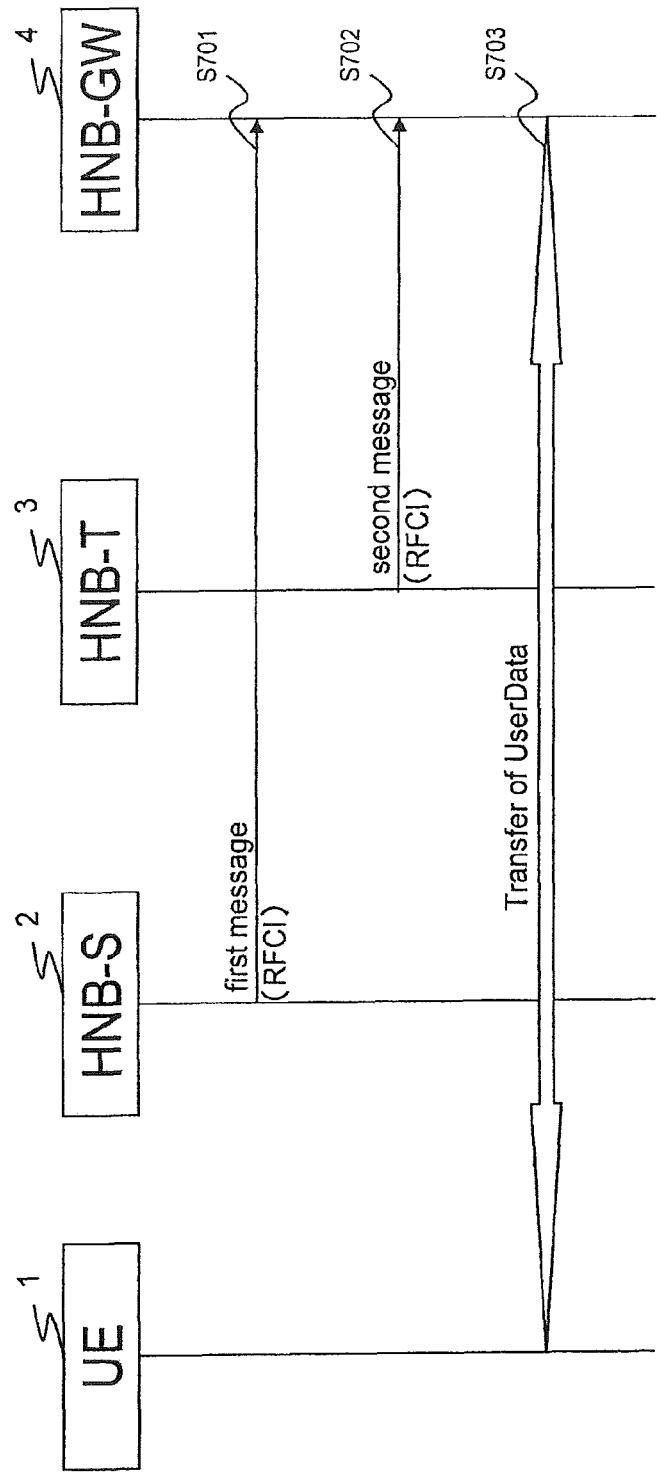
FIG. 18 is a sequence chart for explaining the operation of the mobile communication system of the seventh exemplary embodiment of the present invention.

The operations of the mobile communication system of the present exemplary embodiment are next described in conjunction with the sequence chart shown in FIG. 18.

In Step S701, HNB-S 2 transmits a first message that contains the RFCI information of HNB-S 2 to HNB-GW 4.

In Step S702, HNB-T 3 transmits a second message that contains the RFCI information of HNB-T 3 to HNB-GW 4.

HNB-GW 4 stores the RFCI information of HNB-S 2 that is contained in the first message and the RFCI information of HNB-T 3 that is contained in the second message in storage unit 42D. In addition, HNB-GW 4 further compares the RFCI information of HNB-S 2 and HNB-T 3.

UE 1 subsequently carries out transmission and reception of voice data (user data) with HNB-GW 4 by way of HNB-T 3 in Step S703.

When the RFCI information of HNB-S 2 and the RFCI information of HNB-T 3 do not match at this time, HNB-GW 4 upon reception of voice data from HNB-T 3 carries out the RFCI-conversion of the RFCI values that are appended to the voice data to RFCI values that indicate data frames that have the same construction as the voice data in the RFCI information of HNB-S 2.

HNB-GW 4 then transmits the voice data to which the converted RFCI values have been appended to CN 6.

When the RFCI information of HNB-S 2 and HNB-T 3 match, HNB-GW 4 transmits the voice data that were received from HNB-T 3 and the RFCI values that were appended to the voice data to CN 6 without alteration.

When the RFCI information of HNB-S 2 and the RFCI information of HNB-T 3 do not match in the present exemplary embodiment as described hereinabove, HNB-GW 4 subsequently converts RFCI values that are appended to voice data that are received from HNB-T 3 to the RFCI values that indicate data frames that have the same construction in the RFCI information of HNB-S 2.

As a result, even when RFCI information is not handed over between HNB-S 2 and HNB-T 3, voice communication can be carried out while maintaining transcoder-free operation (TrFO) without change in the event of intra-HNB-GW relocation between HNB.

Eighth Exemplary Embodiment

The present exemplary embodiment is an example in which the seventh exemplary embodiment has been made more specific.

In the present exemplary embodiment, each of HNB-S 2 and HNB-T 3 reports RFCI information to HNB-GW 4 by means of Iu-UP Init messages, and when the RFCI information of HNB-S 2 and the RFCI information of HNB-T 3 do not match, HNB-GW 4 converts the RFCI values that are appended to voice data that are received from HNB-T 3 to the RFCI values that indicate data frames that have the same construction in the RFCI information of HNB-S 2.

However, UTRAN architecture for 3G Home Node B of 3GPP TS 25.467 (Non-Patent Document 4) prescribes that a message of Iu-UP protocol not be terminated in an HNB-GW.

The 3GPP prescription is therefore modified in the present exemplary embodiment and the termination of an Iu-UP message in an HNB-GW is permitted.

Figure 19:
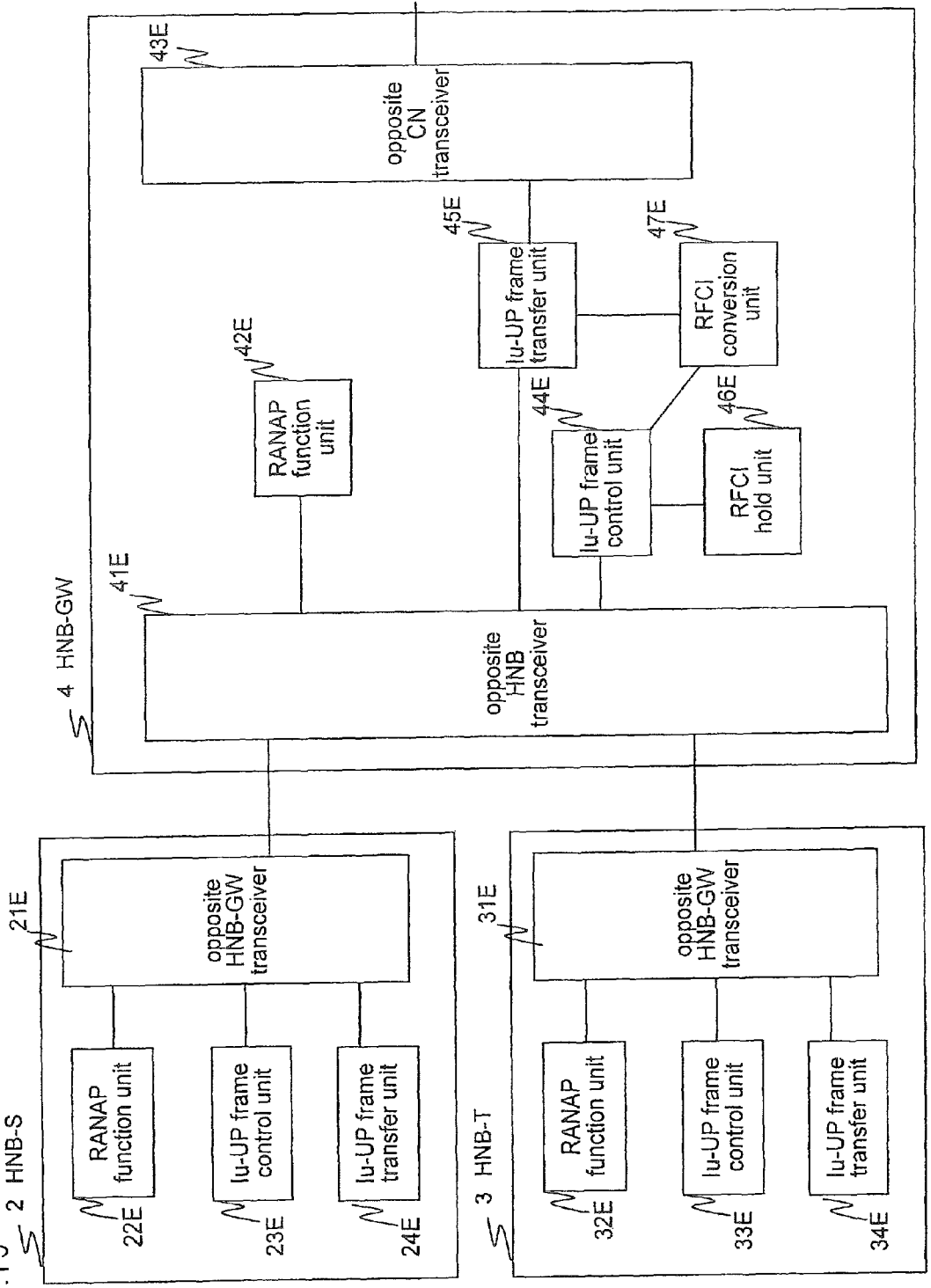
FIG. 19 is a block diagram showing the internal configuration of the HNB and HNB-GW in the mobile communication system of the eighth exemplary embodiment of the present invention.

Referring to FIG. 19, HNB-GW 4 of the present exemplary embodiment includes: opposite HNB transceiver 41E, RANAP function unit 42E, opposite CN transceiver 43E, Iu-UP frame control unit 44E, Iu-UP frame transfer unit 45E, RFCI hold unit 46E, and RFCI conversion unit 47E. In FIG. 19, opposite HNB transceiver 41E constitutes first transceiver unit 41D of FIG. 17, opposite CN transceiver 43E constitutes second transceiver unit 44D of FIG. 17, RFCI hold unit 46E constitutes storage unit 42D of FIG. 17, and the other function blocks make up control unit 43B of FIG. 17.

In addition, HNB-S 2 of the present exemplary embodiment includes: opposite HNB-GW transceiver 21E, RANAP function unit 22E, Iu-UP frame control unit 23E, and Iu-UP frame transfer unit 24E. In FIG. 19, opposite HNB-GW transceiver 21E constitutes transceiver unit 22D of FIG. 17, and the other function blocks make up control unit 21D of FIG. 17.

In addition, HNB-T 3 of the present exemplary embodiment includes opposite HNB-GW transceiver 31E, RANAP function unit 32E, Iu-UP frame control unit 33E, and Iu-UP frame transfer unit 34E. In FIG. 19, opposite HNB-GW transceiver 31E constitutes transceiver unit 32D of FIG. 17, and the other function blocks make up control unit 31D of FIG. 17.

RFCI conversion unit 47E has the function of carrying out an RFCI conversion of converting the RFCI values that are appended to voice data that are received from HNB-T 3 to RFCI values that indicate data frames that have the same construction in the RFCI information of HNB-S 2.

In HNB-GW 4, the other opposite HNB transceiver 41E, RANAP function unit 42E, opposite CN transceiver 43E, Iu-UP frame control unit 44E, Iu-UP frame transfer unit 45E, and RFCI hold unit 46E each carry out the same operations as opposite HNB transceiver 41B, RANAP function unit 42B, opposite CN transceiver 43B, Iu-UP frame control unit 44B, Iu-UP frame transfer unit 45B, and RFCI hold unit 46B, respectively, shown in FIG. 4.

In HNB-S 2, opposite HNB-GW transceiver 21E, RANAP function unit 22E, Iu-UP frame control unit 23E, and Iu-UP frame transfer unit 24E, each carry out operations similar to opposite HNB-GW transceiver 21B, RANAP function unit 22B, Iu-UP frame control unit 23B, and Iu-UP frame transfer unit 24B, respectively, shown in FIG. 4.

In HNB-T 3, opposite HNB-GW transceiver 31E, RANAP function unit 32E, Iu-UP frame control unit 33E, and Iu-UP frame transfer unit 34E each carry out operations similar to opposite HNB-GW transceiver 31B, RANAP function unit 32B, Iu-UP frame control unit 33B, and Iu-UP frame transfer unit 34B, respectively, shown in FIG. 4.

Figure 20:
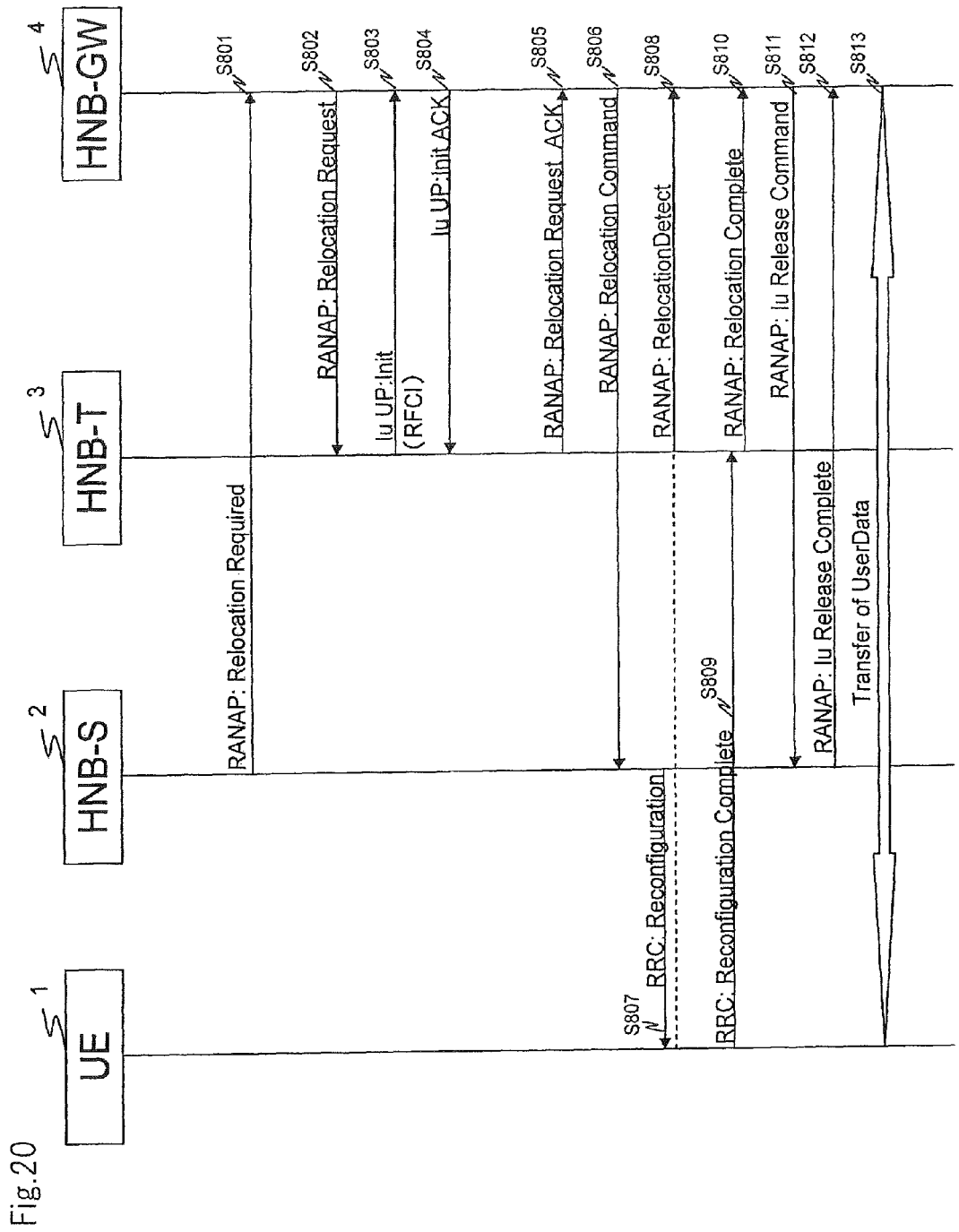
FIG. 20 is a sequence chart for explaining the operation of the mobile communication system of the eighth exemplary embodiment of the present invention.

The operations of the present exemplary embodiment are next described in conjunction with the sequence chart shown in FIG. 20.

In FIG. 20, HNB-GW 4 is assumed to obtain the RFCI information of HNB-S 2 in advance. In other words, HNB-S 2 transmits to HNB-GW 4 an Iu-UP Init message that contains the RFCI information of HNB-S 2 at the time communication is established between HNB-S 2 and HNB-X 8, whereby HNB-GW 4 acquires the RFCI information of HNB-S 2. This procedure is implemented before Step S801 of FIG. 20 and is not described in FIG. 20.

The processing of Steps S801 and S802 that is similar to the processing of Steps S201 and S202 of FIG. 5 is first carried out.

In Step S803, HNB-T 3 next transmits to HNB-GW 4 an Iu-UP Init message that contains the RFCI information of HNB-T 3. HNB-GW 4 terminates the Iu-UP Init message at Iu-UP frame control unit 44E and compares the RFCI information of HNB-T 3 that is contained in the Iu-UP Init message with the RFCI information of HNB-S 2 that was acquired beforehand.

In Step S804, HNB-GW 4 next responds to the Iu-UP Init message by transmitting to HNB-T 3 an Iu-UP Init ACK message.

The processing of Steps S805~S812 that are similar to Steps S203~S211 of FIG. 5 is then carried out, following which UE 1 transmits and receives voice data (user data) with HNB-GW 4 by way of HNB-T 3 in Step S813.

Here, if the RFCI information of HNB-S 2 and the RFCI information of HNB-T 3 do not match in Step S803, the RFCI information of HNB-T 3 and HNB-X 8 also do not match. In such cases, RFCI values that are the same in the two sets of RFCI information of HNB-T 3 and HNB-X 8 may nevertheless indicate data frames having different structures, and RFCI conversion is therefore necessary for voice data that are transmitted in from UE 1 by way of HNB-T 3.

As a result, HNB-GW 4 transfers voice data that have been transmitted in from UE 1 by way of HNB-T 3 to RFCI conversion unit 47E from Iu-UP frame transfer unit 45E; and at RFCI conversion unit 47E, RFCI-conversion is implemented to convert the RFCI values that are appended to these voice data to RFCI values that indicate data frames that have the same construction as the voice data in the RFCI information of HNB-S 2. Voice data to which RFCI values, that have undergone RFCI conversion, are then transferred to Iu-UP frame transfer unit 45E and transmitted to CN 6 by way of opposite CN transceiver 43E.

When the RFCI information of HNB-S 2 and the RFCI information of HNB-T 3 do not match in the present exemplary embodiment as described hereinabove, HNB-GW 4 subsequently converts the RFCI values that are appended to the voice data that were received from HNB-T 3 to RFCI values that indicate data frames that have the same construction in the RFCI information of HNB-S 2.

As a result, voice communication can be carried out while maintaining transcoder-free operation (TrFO) without alteration in the event of intra-HNB-GW relocation between HNB even when RFCI information is not handed over between HNB-S 2 and HNB-T 3.

The description at 7.2 of 3GPP TS 25.467 (Non-Patent Document 4) that is modified by the present exemplary embodiment is as shown below.

Iu-UP is terminated only at CN, HNB, and HNB-GW.

Although the present invention has been described with reference to exemplary embodiments, the present invention is not limited to the above-described exemplary embodiments. The constitution and details of the present invention are open to various modifications within the scope of the present invention that will be clear to one of ordinary skill in the art.

For example, in the first to fourth exemplary embodiments, the control information that was handed over from HNB-S 2 to HNB-T 3 was described only as RFCI information, but the present invention is not limited to this form, and IPTI (Inter PDU Transmission Interval) information may be handed over as an addition.

IPTI information is information that prescribes the data transmission spacing (period) of subflows, and by means of IPTI information, voice data can be uniquely calculated from the total data size of subflow and the AMR codec rate even when the transfer of voice data is not carried out.

Although explanation has been presented that the present invention can be applied to intra-HNB-GW relocation between HNB in the first to sixth exemplary embodiments, the present invention may also be applied to inter-HNB-GW relocation (relocation in which HNB-S 2 and HNB-T 3 are not connected to the same HNB-GW).

In the fifth and sixth exemplary embodiments, HNB-T 3 included the RFCI information of HNB-T 3 in an Iu-UP Init message and transmitted the message, but if the RFCI information of HNB-S 2 has been received at the time that the Iu-UP Init message is to be transmitted, the transmission of the Iu-UP Init message by HNB-T 3 may be prohibited.

The method that is carried out in HNB-S, HNB-T, HNB-GW, and CN node of the present invention may also be applied to a program for causing execution by a computer. In addition, this program can be stored on a recording medium and can be provided to the outside by way of a network.

This application claims the benefits of priority based on Japanese Patent Application No. 2009-187320 for which application was submitted on Aug. 12, 2009 and incorporates by way of citation all of the disclosures of that application.

What is claimed is:

1. A mobile communication system comprising:
 a first Home Node B (HNB);
 a second HNB; and
 a HNB gateway (HNB-GW) that is external with respect to a core network, wherein the first HNB is configured to communicate with a user equipment (UE) before an intra HNB-GW relocation in which the UE is relocated from the first HNB to the second HNB,
 wherein the second HNB is configured to communicate with a user equipment (UE) after the relocation, receive a Radio Access Network Application Part (RANAP) Relocation Request, and send an Iu-User Plane (Iu-UP) Initialization comprising Radio Access Bearer Sub-Flow Combination Indicator (RFCI) information of the second HNB to the HNB-GW during the relocation, the Iu-UP Initialization corresponding to the RANAP Relocation Request, and
 wherein the HNB-GW is configured to receive the Iu-UP Initialization, and to terminate the Iu-UP Initialization from the second HNB.

2. The mobile communication system according to claim 1, wherein the HNB-GW is configured to send Iu-UP Initialization acknowledgement to the second HNB after receiving the Iu-UP Initialization.

3. The mobile communication system according to claim 1, wherein the HNB-GW is configured not to perform forwarding of information in the Iu-UP Initialization.

4. The mobile communication system according to claim 1, wherein the HNB-GW is configured to check whether the RFCI information received from the second HNB matches with RFCI information of the first HNB.

5. The mobile communication system according to claim 4, wherein the HNB-GW is configured to modify the RFCI information received from the second HNB if the RFCI information received from the second HNB does not match with the RFCI information of the first HNB.

6. A Home Node B gateway (HNB-GW) that is external with respect to a core network, wherein the HNB-GW comprises a processor and a memory storing software which, when executed, enables the processor to implement:
 a transceiver which receives, when a first HNB communicates with a user equipment (UE) before an intra HNB-GW relocation in which the UE is relocated from the first HNB to a second HNB, Iu-User Plane (Iu-UP) Initialization comprising Radio Access Bearer Sub-Flow Combination Indicator (RFCI) information from the second HNB, corresponding to a Radio Access Network Application Part (RANAP) Relocation Request transmitted to the second HNB, during the relocation; and
 a control unit which terminates the Iu-UP Initialization from the second HNB.

7. The HNB-GW according to claim 6, wherein the HNB-GW is configured to send Iu-UP Initialization acknowledgement to the second HNB after receiving the Iu-UP Initialization.

8. The HNB-GW according to claim 6, wherein the HNB-GW is configured not to perform forwarding of information in the Iu-UP Initialization.

9. The HNB-GW according to claim 6, wherein the HNB-GW is configured to check whether the RFCI information received from the second HNB matches with RFCI information of the first HNB.

10. The HNB-GW according to claim 9, wherein the HNB-GW is configured to modify the RFCI information received from the second HNB if the RFCI information received from the second HNB does not match with the RFCI information of the first HNB.

* * * * *